US012747117B2

(12) United States Patent
Allen et al.

(10) Patent No.: US 12,747,117 B2
(45) Date of Patent: Sep. 29, 2026

(54) SYSTEMS AND METHODS FOR DYNAMIC PROCESSING OF OBJECTS PROVIDED IN VEHICLES WITH DUAL FUNCTION END EFFECTOR TOOLS

(71) Applicant: Berkshire Grey Operating Company, Inc., Bedford, MA (US)

(72) Inventors: Thomas Allen, Reading, MA (US); Benjamin Cohen, White Plains, NY (US); John Richard Amend, Jr., Fort Collins, CO (US); Joseph Romano, Arlington, MA (US); Matthew T. Mason, Atlanta, GA (US); Yanchun Wu, Sharon, MA (US); Jagtar Singh, Woburn, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 918 days.

(21) Appl. No.: 17/961,477

(22) Filed: Oct. 6, 2022

(65) Prior Publication Data

US 2023/0106572 A1 Apr. 6, 2023

Related U.S. Application Data

(60) Provisional application No. 63/252,807, filed on Oct. 6, 2021.

(51) Int. Cl.

| | |
|---|---|
| ***B65G 67/24*** | (2006.01) |
| ***B65G 43/00*** | (2006.01) |
| ***G06V 20/59*** | (2022.01) |

(52) U.S. Cl.

CPC ............ *B65G 67/24* (2013.01); *B65G 43/00* (2013.01); *G06V 20/59* (2022.01)

(58) Field of Classification Search

CPC ...... B65G 67/24; B65G 43/00; B65G 47/918; G06V 20/59; B25J 9/0084; B25J 9/0093; B25J 9/1682; B25J 15/0616

See application file for complete search history.

(56) References Cited

U.S. PATENT DOCUMENTS

| | | | |
|---|---|---|---|
| 3,721,354 | A | 3/1973 | Raynes et al. |
| 3,734,286 | A | 5/1973 | Simjian |

(Continued)

FOREIGN PATENT DOCUMENTS

| | | | |
|---|---|---|---|
| AU | 2006204622 A1 | 3/2007 | |
| CA | 2985166 A1 | 12/2016 | |

(Continued)

OTHER PUBLICATIONS

CN 209684850 EN translation spec with paragraph numbers espacenet (Year: 2019).*

(Continued)

*Primary Examiner* — Jacob S. Scott
*Assistant Examiner* — Erin Morris
(74) *Attorney, Agent, or Firm* — Gesmer Updegrove LLP

(57) ABSTRACT

An object processing system is disclosed for dynamically providing the removal of objects from a trailer of a tractor trailer. The object processing system includes a load assessment system for assessing a load characteristic of a plurality of objects within the trailer and for providing load assessment data representative of the load characteristic, an object assessment system for assessing a relative position and relative environment of an object of the plurality of objects responsive to the load assessment data, and for providing object assessment data for the object, and a dynamic engagement system for dynamically engaging the objects within the trailer with either of at least two different engagement systems responsive to the object assessment data.

42 Claims, 26 Drawing Sheets

(56) References Cited

U.S. PATENT DOCUMENTS 3,779,405 A 12/1973 Kavanaugh, Jr.
4,186,836 A 2/1980 Wassmer et al.
4,253,791 A 3/1981 Van Drie
4,557,659 A 12/1985 Scaglia
4,722,653 A 2/1988 Williams et al.
4,759,439 A 7/1988 Hartlepp
4,776,742 A 10/1988 Felder
4,802,810 A 2/1989 Gunn
4,815,582 A 3/1989 Canziani
4,846,335 A 7/1989 Hartlepp
5,352,081 A 10/1994 Tanaka
5,460,271 A 10/1995 Kenny et al.
5,509,723 A 4/1996 Bratlie
5,595,263 A 1/1997 Pignataro
5,685,687 A 11/1997 Frye
5,764,013 A 6/1998 Yae
5,839,566 A 11/1998 Bonnet
6,011,998 A 1/2000 Lichti et al.
6,059,092 A 5/2000 Jerue et al.
6,076,023 A 6/2000 Sato
6,401,936 B1 6/2002 Isaacs et al.
6,402,451 B1 6/2002 Brown
6,431,346 B1 8/2002 Gilmore et al.
6,579,053 B1 6/2003 Grams et al.
6,721,444 B1 4/2004 Gu et al.
7,313,464 B1 12/2007 Perreault et al.
7,474,939 B2 1/2009 Oda et al.
7,516,848 B1 4/2009 Shakes et al.
7,861,844 B2 1/2011 Hayduchok et al.
8,662,314 B2 3/2014 Jones et al.
8,718,814 B1 5/2014 Clark et al.
8,874,270 B2 10/2014 Ando
8,952,284 B1 2/2015 Wong et al.
8,972,045 B1 3/2015 Mountz et al.
9,061,868 B1 6/2015 Paulsen et al.
9,120,622 B1 9/2015 Elazary et al.
9,227,323 B1 1/2016 Konolige et al.
9,259,844 B2 2/2016 Xu et al.
9,283,680 B2 3/2016 Yasuda et al.
9,415,949 B2 8/2016 Buse
9,457,970 B1 10/2016 Zevenbergen et al.
9,486,926 B2 11/2016 Kawano
9,492,923 B2 11/2016 Wellman et al.
9,520,012 B2 12/2016 Stiernagle
9,604,363 B2 3/2017 Ban
9,744,669 B2 8/2017 Wicks et al.
9,828,195 B1 11/2017 Criswell
10,173,486 B1 1/2019 Lee et al.
10,206,519 B1 2/2019 Gyori et al.
10,216,865 B1* 2/2019 Theobald ............... B25J 9/1687
10,549,928 B1* 2/2020 Chavez ................ B65G 47/905
11,034,529 B2 6/2021 Wagner et al.
11,267,662 B2 3/2022 Geyer et al.
2002/0134056 A1 9/2002 Dimario et al.
2002/0179502 A1 12/2002 Cerutti et al.
2003/0042112 A1 3/2003 Woerner et al.
2004/0112719 A1 6/2004 Gilmore et al.
2004/0144618 A1 7/2004 McDonald et al.
2005/0002772 A1 1/2005 Stone
2006/0153667 A1 7/2006 Pruteanu et al.
2006/0242785 A1 11/2006 Cawley et al.
2006/0255617 A1* 11/2006 Clarke .................. B60P 7/0876
410/97
2006/0260913 A1 11/2006 Wolf et al.
2008/0181753 A1 7/2008 Bastian et al.
2010/0125361 A1 5/2010 Mougin et al.
2010/0180711 A1 7/2010 Kilibarda et al.
2010/0217528 A1 8/2010 Sato et al.
2010/0241260 A1 9/2010 Kilibarda et al.
2011/0144798 A1 6/2011 Freudelsperger
2012/0118699 A1 5/2012 Buchmann et al.
2013/0343640 A1 12/2013 Buehler et al.
2014/0005831 A1 1/2014 Naderer et al.
2014/0067121 A1 3/2014 Brooks et al.
2014/0067127 A1 3/2014 Gotou
2014/0205403 A1 7/2014 Criswell
2014/0244026 A1 8/2014 Neiser
2014/0277693 A1 9/2014 Naylor
2014/0291112 A1 10/2014 Lyon et al.
2014/0341694 A1 11/2014 Girtman et al.
2014/0341695 A1 11/2014 Girtman et al.
2014/0360924 A1 12/2014 Smith et al.
2014/0364998 A1 12/2014 Neiser et al.
2015/0037123 A1 2/2015 Hobbs
2015/0037131 A1* 2/2015 Girtman ............... B25J 15/0052
414/797
2015/0057793 A1 2/2015 Kawano
2015/0063972 A1 3/2015 Girtman et al.
2015/0063973 A1 3/2015 Girtman et al.
2015/0073589 A1 3/2015 Kohdl et al.
2015/0098775 A1 4/2015 Razumov
2015/0224650 A1 8/2015 Xu et al.
2015/0274447 A1 10/2015 McCollum et al.
2015/0306634 A1 10/2015 Maeda et al.
2015/0308466 A1 10/2015 Girtman et al.
2015/0352721 A1* 12/2015 Wicks .................... B25J 9/1664
700/228
2015/0360882 A1 12/2015 Girtman
2015/0369618 A1 12/2015 Barnard et al.
2015/0375398 A1 12/2015 Penn et al.
2015/0375880 A1 12/2015 Ford et al.
2016/0027093 A1 1/2016 Crebier
2016/0075521 A1 3/2016 Puchwein et al.
2016/0096694 A1 4/2016 Baylor et al.
2016/0136816 A1 5/2016 Pistorino
2016/0199884 A1 7/2016 Lykkegaard et al.
2016/0221187 A1 8/2016 Bradski et al.
2016/0221762 A1 8/2016 Schroader
2016/0221766 A1 8/2016 Schroader et al.
2016/0243704 A1 8/2016 Vakanski et al.
2016/0244262 A1 8/2016 O'Brien et al.
2016/0264366 A1 9/2016 Heitplatz
2016/0280477 A1 9/2016 Pippin
2016/0368720 A1 12/2016 Criswell
2017/0021499 A1 1/2017 Wellman et al.
2017/0043953 A1 2/2017 Battles et al.
2017/0050315 A1 2/2017 Henry et al.
2017/0057091 A1 3/2017 Wagner et al.
2017/0066597 A1 3/2017 Hiroi
2017/0073175 A1 3/2017 Wicks et al.
2017/0080566 A1 3/2017 Stubbs et al.
2017/0106532 A1 4/2017 Wellman et al.
2017/0113885 A1 4/2017 Criswell
2017/0121134 A1 5/2017 Girtman et al.
2017/0157648 A1 6/2017 Wagner et al.
2017/0305694 A1 10/2017 McMurrough et al.
2017/0312789 A1 11/2017 Schroader
2017/0349385 A1 12/2017 Moroni et al.
2018/0072517 A1 3/2018 Girtman et al.
2018/0081369 A1* 3/2018 Fischer ................ G05D 1/0231
2018/0111765 A1 4/2018 Wicks et al.
2018/0111769 A1 4/2018 Yuvaraj et al.
2018/0134501 A1 5/2018 Ge et al.
2018/0148279 A1 5/2018 Criswell
2018/0194574 A1 7/2018 Wagner et al.
2018/0229987 A1* 8/2018 Kaup ...................... B66F 9/122
2018/0290845 A1 10/2018 McMurrough et al.
2018/0297786 A1 10/2018 Clucas et al.
2018/0313861 A1* 11/2018 Takai .................. G01N 35/026
2018/0334339 A1 11/2018 Criswell
2018/0346264 A9 12/2018 Girtman et al.
2018/0362270 A1 12/2018 Clucas et al.
2019/0084769 A1 3/2019 Clucas et al.
2019/0262994 A1 8/2019 Yuvaraj et al.
2019/0315582 A1 10/2019 Criswell
2019/0370511 A1 12/2019 Hamer et al.
2020/0010288 A1 1/2020 McMurrough et al.
2020/0039747 A1 2/2020 Ahmann et al.
2020/0148488 A1 5/2020 Stenson
2020/0165074 A1 5/2020 Wagner et al.
2020/0171650 A1 6/2020 Hallock et al.
2020/0202506 A1* 6/2020 Robinson ................ G06T 7/001
2020/0223066 A1* 7/2020 Diankov ................ B25J 9/1664
2020/0234071 A1 7/2020 Yuvaraj et al.

(56) References Cited

U.S. PATENT DOCUMENTS

| | | | | |
|---|---|---|---|---|
| 2020/0270076 | A1 | 8/2020 | Geyer et al. | |
| 2020/0276713 | A1 | 9/2020 | Zhang et al. | |
| 2020/0324986 | A1 | 10/2020 | McMurrough et al. | |
| 2021/0122589 | A1 | 4/2021 | Griggs | |
| 2021/0129334 | A1* | 5/2021 | Kanunikov | B25J 9/1671 |
| 2021/0171295 | A1* | 6/2021 | Azuma | B65G 67/08 |
| 2021/0198090 | A1* | 7/2021 | Bando | B66F 9/063 |
| 2021/0237986 | A1 | 8/2021 | Wagner et al. | |
| 2021/0363770 | A1 | 11/2021 | Lindbo et al. | |
| 2022/0041383 | A1 | 2/2022 | Krishnamoorthy et al. | |
| 2022/0080584 | A1 | 3/2022 | Wicks et al. | |
| 2022/0097243 | A1 | 3/2022 | Makhal et al. | |
| 2022/0144561 | A1 | 5/2022 | Geyer et al. | |
| 2022/0185602 | A1 | 6/2022 | Stenson | |
| 2023/0104427 | A1 | 4/2023 | Allen et al. | |
| 2023/0105141 | A1 | 4/2023 | Allen et al. | |
| 2023/0106508 | A1 | 4/2023 | Allen et al. | |
| 2023/0134924 | A1 | 5/2023 | Sun et al. | |
| 2023/0150137 | A1 | 5/2023 | Sun et al. | |
| 2023/0158676 | A1 | 5/2023 | Sun et al. | |
| 2023/0271323 | A1 | 8/2023 | Sun et al. | |
| 2023/0271797 | A1 | 8/2023 | Sun et al. | |

FOREIGN PATENT DOCUMENTS

| | | | | | |
|---|---|---|---|---|---|
| CA | 3046214 | C | | 1/2022 | |
| CA | 3139255 | C | | 7/2023 | |
| CA | 3139267 | C | | 7/2023 | |
| CA | 3139272 | C | | 7/2023 | |
| CN | 104743367 | A | | 7/2015 | |
| CN | 105905019 | A | | 8/2016 | |
| CN | 205500186 | U | | 8/2016 | |
| CN | 106167180 | A | * | 11/2016 | B65G 67/24 |
| CN | 106629098 | A | | 5/2017 | |
| CN | 109311545 | A | | 2/2019 | |
| CN | 209684850 | U | * | 11/2019 | |
| CN | 111723704 | A | | 9/2020 | |
| CN | 112272620 | A | | 1/2021 | |
| DE | 19510392 | A1 | | 9/1996 | |
| DE | 102004001181 | A1 | | 8/2005 | |
| DE | 102007023909 | A1 | | 11/2008 | |
| DE | 102007024670 | A1 | | 12/2008 | |
| DE | 102010033115 | A1 | | 2/2012 | |
| DE | 102011083095 | A1 | | 3/2013 | |
| DE | 102014111396 | A1 | | 2/2016 | |
| EP | 0235488 | A1 | | 9/1987 | |
| EP | 0613841 | A1 | | 9/1994 | |
| EP | 0767113 | A2 | | 4/1997 | |
| EP | 1223129 | A1 | | 7/2002 | |
| EP | 1695927 | A2 | | 8/2006 | |
| EP | 1995192 | A2 | | 11/2008 | |
| EP | 2055654 | A1 | | 5/2009 | |
| EP | 2152617 | B1 | | 10/2011 | |
| EP | 2500150 | A2 | * | 9/2012 | B25J 15/0019 |
| EP | 2650237 | A1 | | 10/2013 | |
| EP | 2745982 | A2 | | 6/2014 | |
| EP | 2937299 | A1 | | 10/2015 | |
| EP | 3006379 | A2 | | 4/2016 | |
| EP | 3112295 | A1 | | 1/2017 | |
| EP | 3623324 | A1 | * | 3/2020 | B65G 1/00 |
| FR | 1457450 | A | | 1/1966 | |
| FR | 2832654 | A1 | | 5/2003 | |
| GB | 2084531 | A | | 4/1982 | |
| GB | 2507707 | A | | 5/2014 | |
| JP | S54131278 | A | | 10/1979 | |
| JP | S63310406 | A | | 12/1982 | |
| JP | H0395001 | A | | 4/1991 | |
| JP | H08157016 | A | | 6/1996 | |
| JP | H05324662 | B2 | | 10/2001 | |
| JP | 2002028577 | A | | 1/2002 | |
| JP | 2003150230 | A | | 5/2003 | |
| JP | 2007182286 | A | | 7/2007 | |
| JP | 2008080300 | A | | 4/2008 | |
| JP | 2010202291 | A | | 9/2010 | |
| JP | 2014141313 | A | | 8/2014 | |
| JP | 6611297 | B1 | | 11/2019 | |
| KR | 20160057668 | A | * | 5/2016 | B66F 9/063 |
| KR | 101710104 | B1 | * | 3/2017 | B66F 9/063 |
| KR | 101847787 | B1 | * | 4/2018 | B66F 9/22 |
| WO | 03095339 | A1 | | 11/2003 | |
| WO | 2007009136 | A1 | | 1/2007 | |
| WO | 2008145223 | A1 | | 12/2008 | |
| WO | 2010017872 | A1 | | 2/2010 | |
| WO | 2010034044 | A1 | | 4/2010 | |
| WO | 2011038442 | A2 | | 4/2011 | |
| WO | 2011128384 | A1 | | 10/2011 | |
| WO | 2012024714 | A2 | | 3/2012 | |
| WO | 2012127102 | A9 | | 9/2012 | |
| WO | 2014064592 | A2 | | 5/2014 | |
| WO | 2014111483 | A1 | | 7/2014 | |
| WO | 2015035300 | A1 | | 3/2015 | |
| WO | 2015118171 | A1 | | 8/2015 | |
| WO | 2015162390 | A1 | | 10/2015 | |
| WO | 2016198565 | A1 | | 12/2016 | |
| WO | 2018107000 | A1 | | 6/2018 | |
| WO | 2023059485 | A1 | | 4/2023 | |
| WO | 2023059636 | A1 | | 4/2023 | |
| WO | 2023059828 | A1 | | 4/2023 | |
| WO | 2023059830 | A1 | | 4/2024 | |

OTHER PUBLICATIONS

EP3623324 spec with paragraph numbers espacenet (Year: 2020).*

KR101847787 spec with paragraph numbers espacenet (Year: 2018).*

EP2500150 spec with paragraph numbers espacenet (Year: 2012).*

Annex to Form PCT/ISA/206 (Partial Search) issued by the International Searching Authority (the European Patent Office) in related international application No. PCT/US2022/045671 on Jan. 30, 2023, xx pages.

Annex to Form PCT/ISA/206 (Partial Search) issued by the International Searching Authority (the European Patent Office) in related international application No. PCT/US2022/045943 on Jan. 30, 2023, xx pages.

Cipolla etal., "Visually Guided Grasping in Unstructured Environments," Journal of Robotics and Autonomous Systems, vol. 19, No. 3-4, Mar. 1, 1997, pp. 337-346.

Communication pursuant to Article 94(3) EPC issued by the European Patent Office in related European Patent Application No. 17826628.4 on Aug. 31, 2022, 7 pages.

Communication pursuant to Rules 161(1) and 162 EPC issued by the European Patent Office on Jul. 16, 2019 in related European Patent Application No. 17826628.4, 3 pages.

Decision on Rejection issued by the China National Intellectual Property Administration, P.R.C in related Chinese Patent Application No. 201780075644.9 on Jun. 23, 2021, 23 pages.

Examiner's Report issued by the Innovation, Sciences and Economic Development Canada in related Canadian Patent Application No. 3,046,214 on May 25, 2020, 4 pages.

Examiner's Report issued by the Innovation, Sciences and Economic Development Canada in related Canadian Patent Application No. 3,046,214 on Jan. 12, 2021, 4 pages.

Final Office Action issued by the U.S. Patent and Trademark Office in related U.S. Appl. No. 15/835,764 on Jun. 11, 2019, 13 pages.

First Office Action, along with its English translation, issued by the National Intellectual Property Administration, P.R.C in related Chinese Patent Application No. 201780075644.9 on May 20, 2020, 11 pages.

International Preliminary Report on Patentability issued by the International Searching Authority, the European Patent Office, in related International Patent Application PCT/US2017/065264 mailed Jun. 11, 2019, 9 pgs.

International Search Report and Written Opinion issued by the International Searching Authority, the European Patent Office, in related International Patent Application PCT/US2017/065264 mailed Mar. 19, 2018, 12 pgs.

Klingbeil et al., "Grasping with Application to an Autonomous Checkout Robot," Journal of Robotics and Automation (ICRA), 2011 IEEE, May 9, 2011, pp. 2837-2844.

(56) References Cited

OTHER PUBLICATIONS

Non-Final Office Action issued by the U.S. Patent and Trademark Office in related U.S. Appl. No. 15/835,764 on Sep. 16, 2019, 8 pages.

Non-Final Office Action issued by the United States Patent and Trademark Office in related U.S. Appl. No. 16/776,197 on Sep. 29, 2020, 13 pages.

Non-Final Office Action issued in related U.S. Appl. No. 15/835,764 on Nov. 20, 2018, 10 pages.

Notification of Transmittal of the International Search Report and the Written Opinion of the International Searching Authority and the International Search Report and Written Opinion issued by the International Searching Authority (the European Patent Office) in related international application No. PCT/US2022/044927 on Jan. 27, 2023, 15 pages.

Notification of Transmittal of the International Search Report and the Written Opinion of the International Searching Authority and the International Search Report and Written Opinion issued by the International Searching Authority (the European Patent Office) in related international application No. PCT/US2022/045947 on Feb. 1, 2023, 17 pages.

Second Office Action, along with its English translation, issued by the National Intellectual Property Administration, P.R.C in related Chinese Patent Application No. 201780075644.9 on Jan. 6, 2021, 26 pages.

International Preliminary Report on Patentability issued by the International Searching Authority, the European Patent Office, in related International Patent Application PCT/US2022/045943 mailed Apr. 9, 2024, 13 pgs.

International Preliminary Report on Patentability issued by the International Searching Authority, the European Patent Office, in related International Patent Application PCT/US2022/045671 mailed Apr. 18, 2024, 14 pgs.

International Preliminary Report on Patentability issued by the International Searching Authority, the European Patent Office, in related International Patent Application PCT/US2022/045947 mailed Apr. 18, 2024, 10 pgs.

International Preliminary Report on Patentability issued by the International Searching Authority, the European Patent Office, in related International Patent Application PCT/US2022/044927 mailed Apr. 18, 2024, 8 pgs.

Non-Final Office Action issued by the United States Patent and Trademark Office in related U.S. Appl. No. 17/953,982 on Jul. 3, 2023, 6 pages.

Non-Final Office Action issued by the United States Patent and Trademark Office in related U.S. Appl. No. 17/236,252 on Mar. 10, 2023, 14 pages.

Notification of Transmittal of the International Search Report and the Written Opinion of the International Searching Authority and the International Search Report and Written Opinion issued by the International Searching Authority (the European Patent Office) in related international application No. PCT/US2022/045671 on Mar. 21, 2023, 24 pages.

Notification of Transmittal of the International Search Report and the Written Opinion of the International Searching Authority and the International Search Report and Written Opinion issued by the International Searching Authority (the European Patent Office) in related international application No. PCT/US2022/045943 on Mar. 21, 2023, 23 pages.

Examiner's Report issued by Innovation, Science and Economic Development Canada (Canadian Intellectual Property Office) in related Canadian Patent Application No. 3,139,261 on May 18, 2023, 4 pages.

Notice on the First Office Action issued by the China National Intellectual Property Administration in related Chinese application No. 202280067663.8 on Apr. 29, 2026, 17 pages.

* cited by examiner

SYSTEMS AND METHODS FOR DYNAMIC PROCESSING OF OBJECTS PROVIDED IN VEHICLES WITH DUAL FUNCTION END EFFECTOR TOOLS

PRIORITY

The present application claims priority to U.S. Provisional Patent Application No. 63/252,807 filed Oct. 6, 2021, the disclosure of which is hereby incorporated by reference in its entirety.

BACKGROUND

The invention generally relates to automated, robotic and other object processing systems such as sortation systems, and relates in particular to automated and robotic systems intended for use in environments requiring, for example, that a variety of objects (e.g., parcels, packages, and articles etc.) be processed and distributed to several output destinations.

Many parcel distribution systems receive parcels from a vehicle, such as a trailer of a tractor trailer. The parcels are unloaded and delivered to a processing station in a disorganized stream that may be provided as individual parcels or parcels aggregated in groups such as in bags, and may be provided to any of several different conveyances, such as a conveyor, a pallet, a Gaylord, or a bin. Each parcel must then be distributed to the correct destination container, as determined by identification information associated with the parcel, which is commonly determined by a label printed on the parcel or on a sticker applied to the parcel. The destination container may take many forms, such as a bag or a bin.

The sortation of such parcels from the vehicle has traditionally been done, at least in part, by human workers that unload the vehicle, then scan the parcels, e.g., with a hand-held barcode scanner, and then place the parcels at assigned locations. For example many order fulfillment operations achieve high efficiency by employing a process called wave picking. In wave picking, orders are picked from warehouse shelves and placed at locations (e.g., into bins) containing multiple orders that are sorted downstream. At the sorting stage individual articles are identified, and multi-article orders are consolidated, for example into a single bin or shelf location, so that they may be packed and then shipped to customers. The process of sorting these objects has traditionally been done by hand. A human sorter picks an object from an incoming bin, finds a barcode on the object, scans the barcode with a handheld barcode scanner, determines from the scanned barcode the appropriate bin or shelf location for the object, and then places the object in the so-determined bin or shelf location where all objects for that order have been defined to belong. Automated systems for order fulfillment have also been proposed, but such systems still require that objects be first removed from a vehicle for processing if they arrive by vehicle.

Such systems do not therefore, adequately account for the overall process in which objects are first delivered to and provided at a processing station by a vehicle such as a trailer of a tractor trailer. Additionally, many processing stations, such as sorting stations for sorting parcels, are at times, at or near full capacity in terms of available floor space and sortation resources, and there is further a need therefore for systems to unload vehicles and efficiently and effectively provide an ordered stream of objects.

SUMMARY

In accordance with an aspect, the invention provides an object processing system for dynamically providing the removal of objects from a trailer of a tractor trailer. The object processing system includes a load assessment system for assessing a load characteristic of a plurality of objects within the trailer and for providing load assessment data representative of the load characteristic, an object assessment system for assessing a relative position and relative environment of an object of the plurality of objects responsive to the load assessment data, and for providing object assessment data for the object, and a dynamic engagement system for dynamically engaging the objects within the trailer with either of at least two different engagement systems responsive to the object assessment data.

In accordance with another aspect, the invention provides an object processing system for dynamically providing the removal of objects from a trailer of a tractor trailer. The object processing system includes a load assessment system for assessing a load characteristic of a plurality of objects within the trailer and for providing load assessment data representative of the load characteristic, an engagement system for engaging the objects within the trailer responsive to the load assessment data, and a securement detection system for detecting whether any of the plurality of objects within the trailer are secured from movement relative any of the trailer or other objects of the plurality of objects.

In accordance with a further aspect, the invention provides an object processing system for dynamically providing the removal of objects from a trailer of a tractor trailer. The object processing system includes an object assessment system for assessing a relative position and immediate environment of object of the plurality of objects, and for providing object assessment data for the object, a dynamic engagement system for dynamically engaging the objects within the trailer with either of at least two different engagement systems responsive to the object assessment data, and a securement detection system for detecting whether any of the plurality of objects within the trailer are secured from movement relative any of the trailer or other objects of the plurality of objects.

BRIEF DESCRIPTION OF THE DRAWINGS

The following description may be further understood with reference to the accompanying drawings in which.

The drawings are shown for illustrative purposes only.

DETAILED DESCRIPTION

Figure 1:
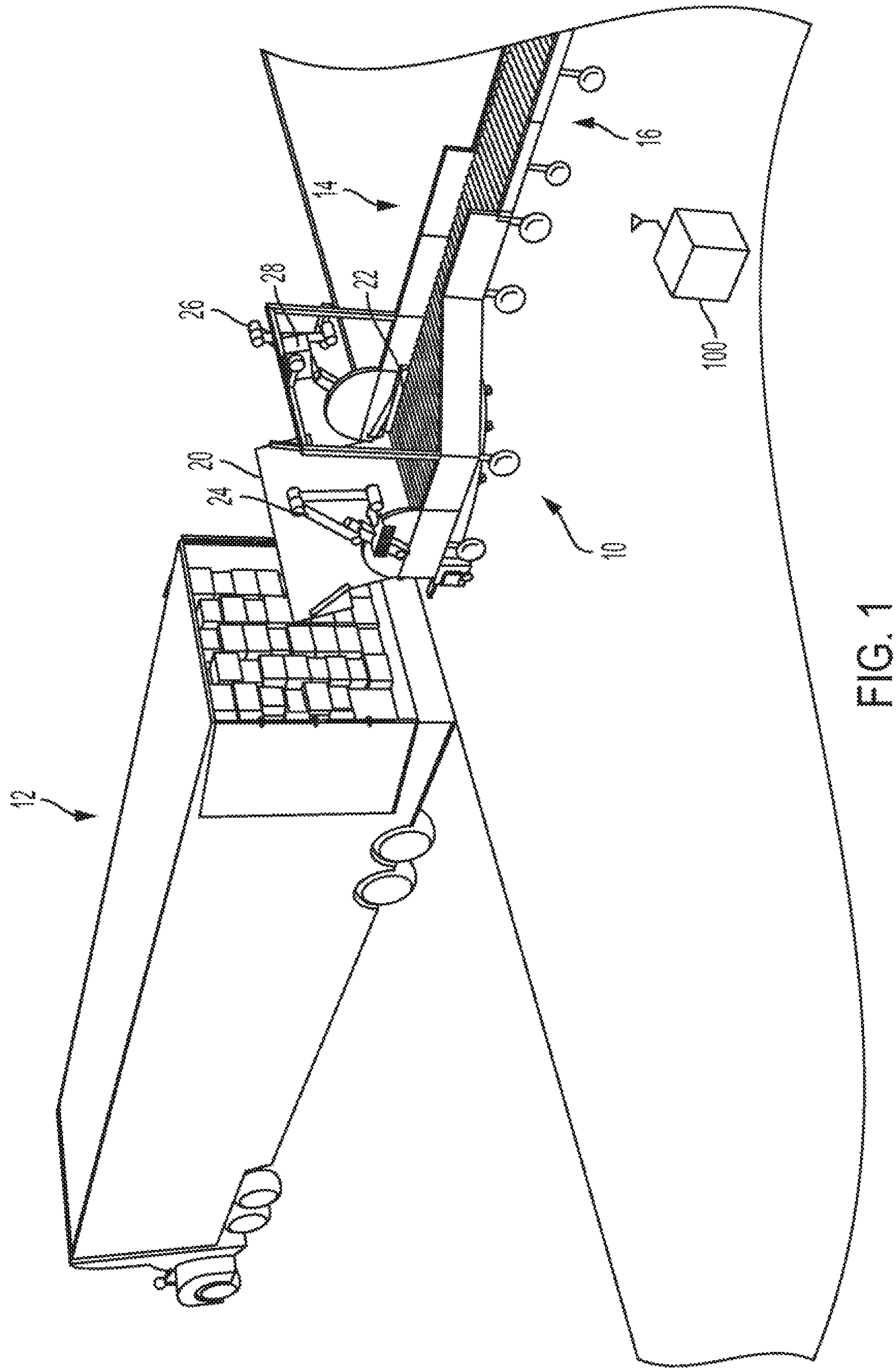
FIG. 1 shows an illustrative diagrammatic view of an object processing system in accordance with an aspect of the present invention.

In accordance with various aspects, the invention provides a dynamic engagement system for engaging objects within a trailer of a tractor trailer. With reference for example to FIG. 1, a dynamic engagement system 10 may engage objects within a trailer 12, and include a chassis 14 that couples to a warehouse conveyor 16 via couplings 18. The chassis 14 (and the conveyor 16) are movable on wheels for permitting the engagement system 10 to enter into (and back out of) the trailer 12. The wheels on the chassis 14 are powered and the control system is remotely coupled to one or more computer processing systems 100.

Figure 2:
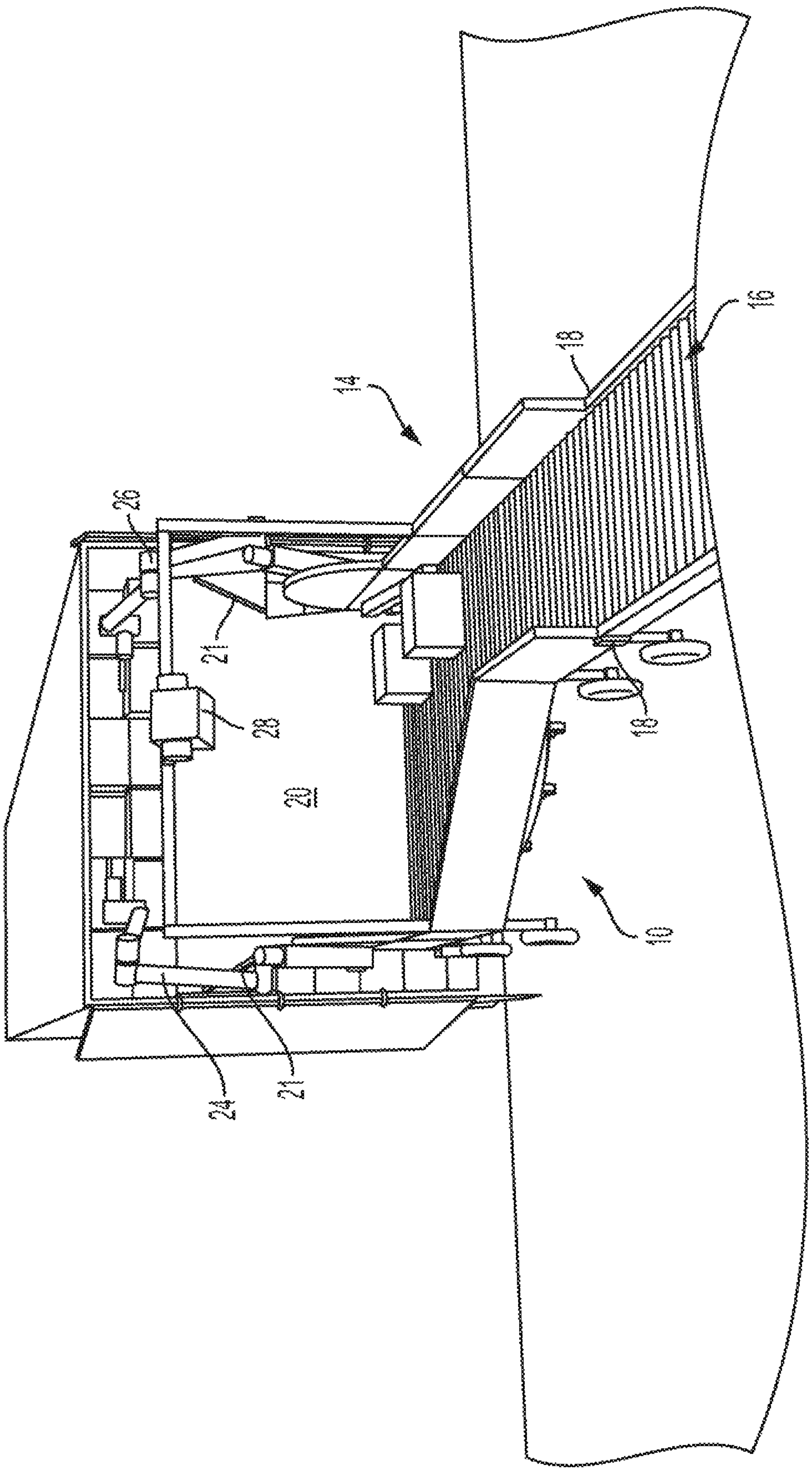
FIG. 2 shows an illustrative diagrammatic end view of the object processing system of FIG. 1.

With further reference to FIG. 2, the dynamic engagement system includes a collection panel 20 that may be pivoted about its bottom edge to facilitate drawing objects from within the trailer 12 onto the conveyor chassis 14. In particular, an upper edge of the collection panel 20 may be positioned adjacent an upper level of a stack of objects within the trailer using one or more powered rotational assist units 22 (e.g., two on each side as further shown in FIG. 14). Each assist unit 22 may also include force torque sensor feedback for measuring any forces acting on the panel 20. The powered rotational assist units 22 rotate the panel upward and downward about an axis 19 at the bottom of the panel 20 (shown in FIG. 20). Using for example, the force torque sensor feedback, the system may lower the panel toward a stack of objects, detect that the panel has made contact with the stack, and may remain in position or back up a small distance until the panel is no longer contacting the stack of objects. Once the panel 20 is positioned adjacent a stack of objects (e.g., just below a top row of a stack of objects), two articulated arms 24, 26 are employed adjacent the panel to urge objects from the stack onto the panel 20 (which may include one or more guides 21).

Figure 3:
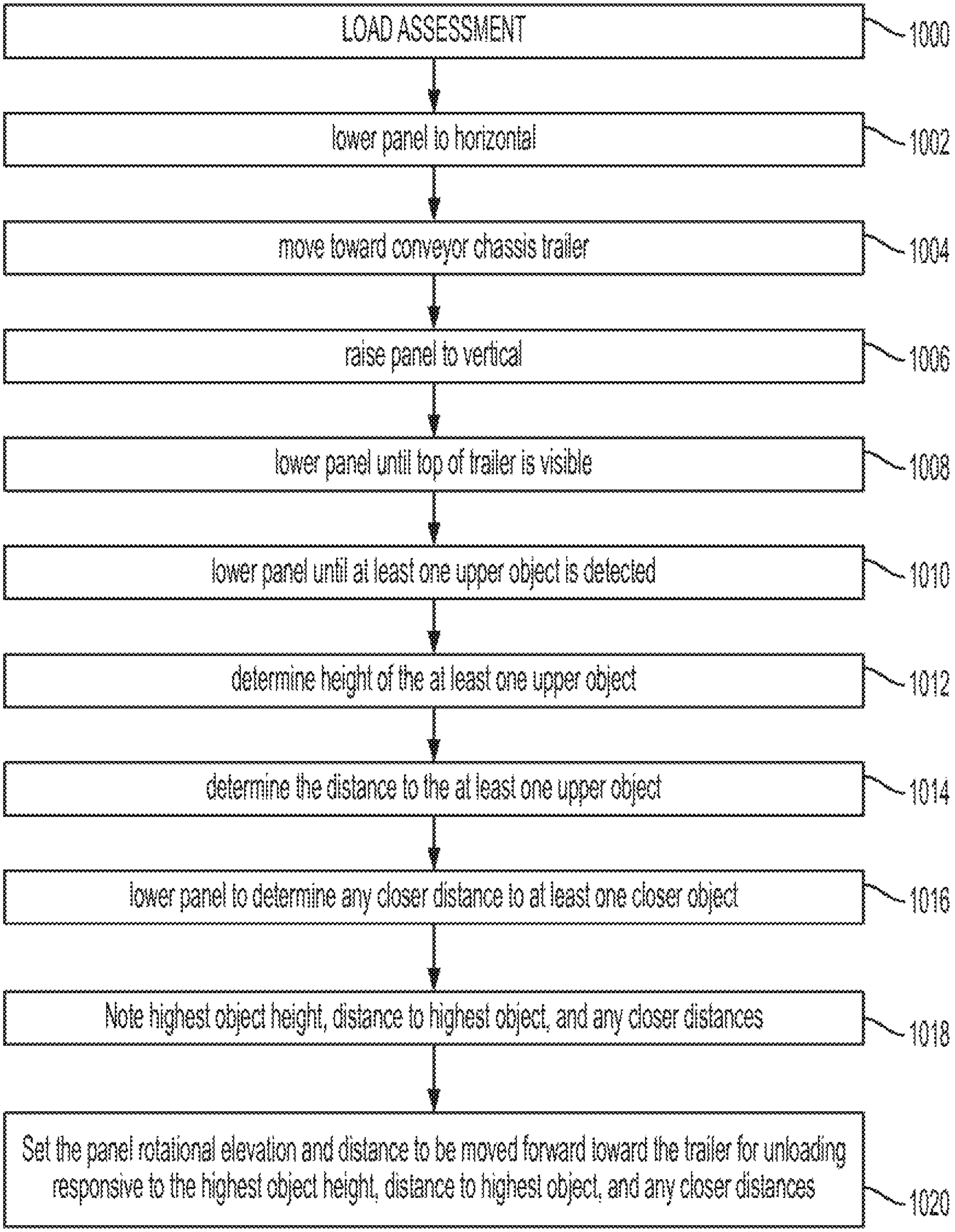
FIG. 3 shows an illustrative diagrammatic functional flow diagram of a load assessment routine in a system in accordance with an aspect of the present invention.

Initially, the load of objects within a trailer may be assessed. With reference to FIG. 3, a load assessment routine may begin (step 1000) by lowering the panel 20 to a position that is approximately horizontal (step 1002), the conveyor chassis 14 may move toward the trailer (step 1004), and the panel may then be raised to a generally vertical position (step 1006). This may ensure that the dynamic engagement system does not begin too close to the objects. The panel is then lowered until the top of the trailer is visible (step 1008), and then continued to be lowered until at least one upper object is detected (step 1010). Distance and position detection sensors in the perception unit 28 are then used to determine a height of the at least one upper object (step 1012) as well as a distance to the at least one upper object (step 1014). The panel is then further lowered to determine whether (and if so where) any lower objects are provided in the trailer that are closer in distance to the dynamic engagement system than the at least one upper object (step 1016). The highest object height, distance to the highest object, and distances to any closer objects are noted (step 1018), and the system them sets the panel rotation elevation and distance to be moved forward toward the trailer for unloading responsive to the highest object height, distance to the highest object, and distances to any closer objects (step 1020). In particular, the panel is positioned to be near but below the closest and highest objects so that programmable motion devices (e.g., articulated arms) may be used to urge objects onto the panel 20, from which the objects will be guided along conveyor section 14 to warehouse conveyor 16.

Figure 4:
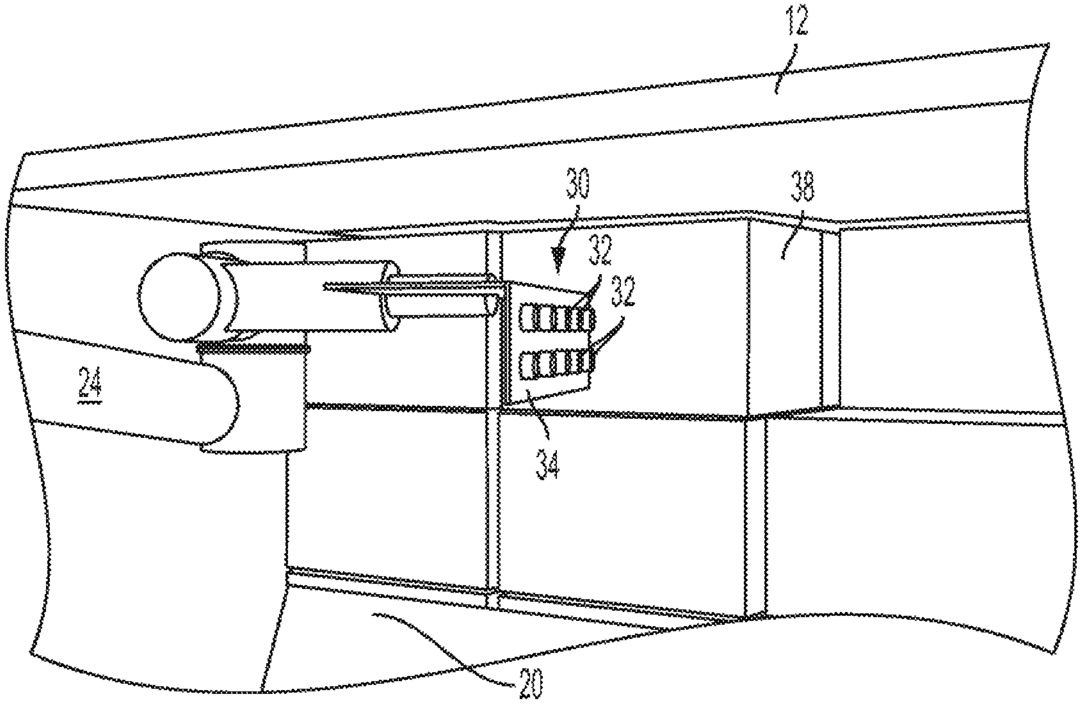
FIG. 4 shows an illustrative diagrammatic enlarged view of a dual-purpose tool in the object processing system of FIG. 1 showing a pull side of the tool.
Figure 5:
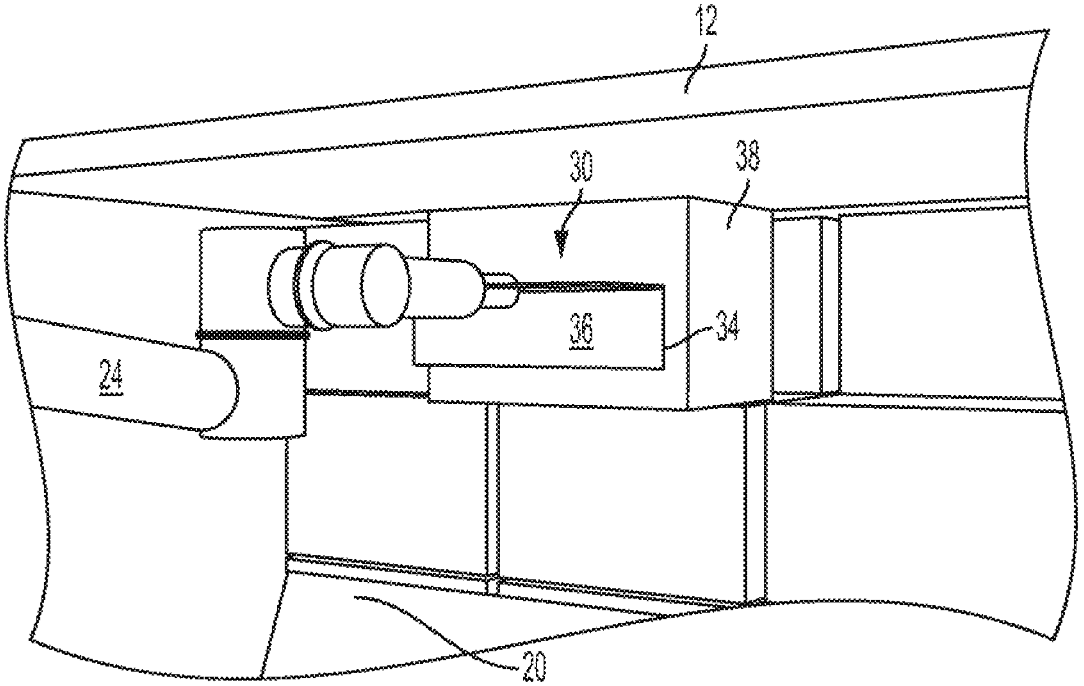
FIG. 5 shows an illustrative diagrammatic enlarged view of the dual-purpose tool in the object processing system of FIG. 4 showing the pull side of the tool engaging an object.
Figure 6:
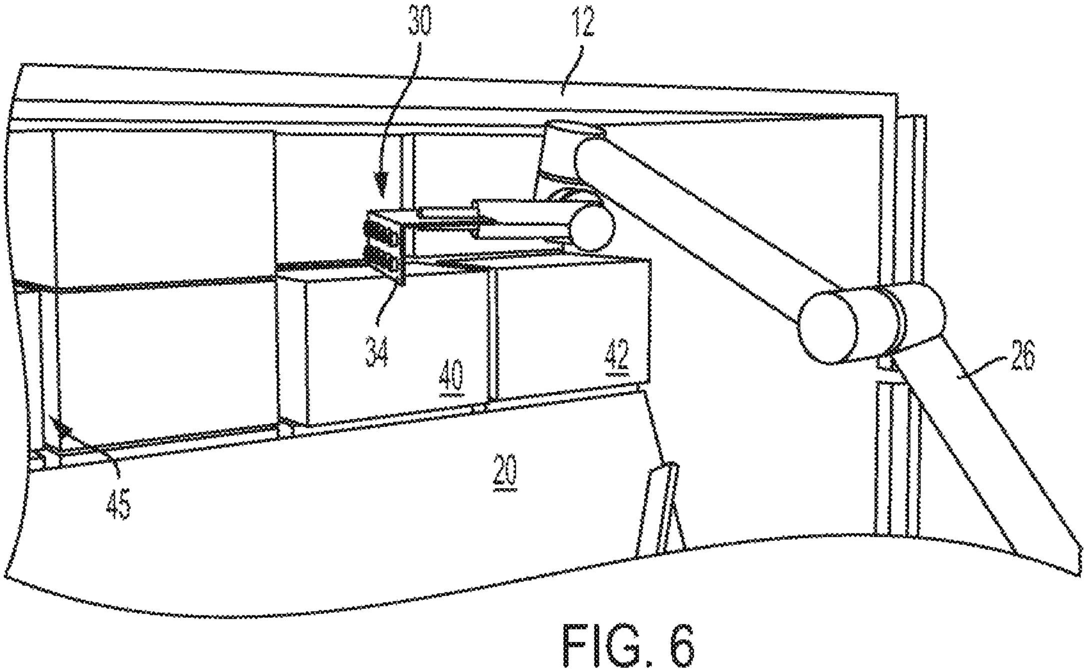
FIG. 6 shows an illustrative diagrammatic enlarged view of a dual-purpose tool in the object processing system of FIG. 1 showing a rake side of the tool.
Figure 7:
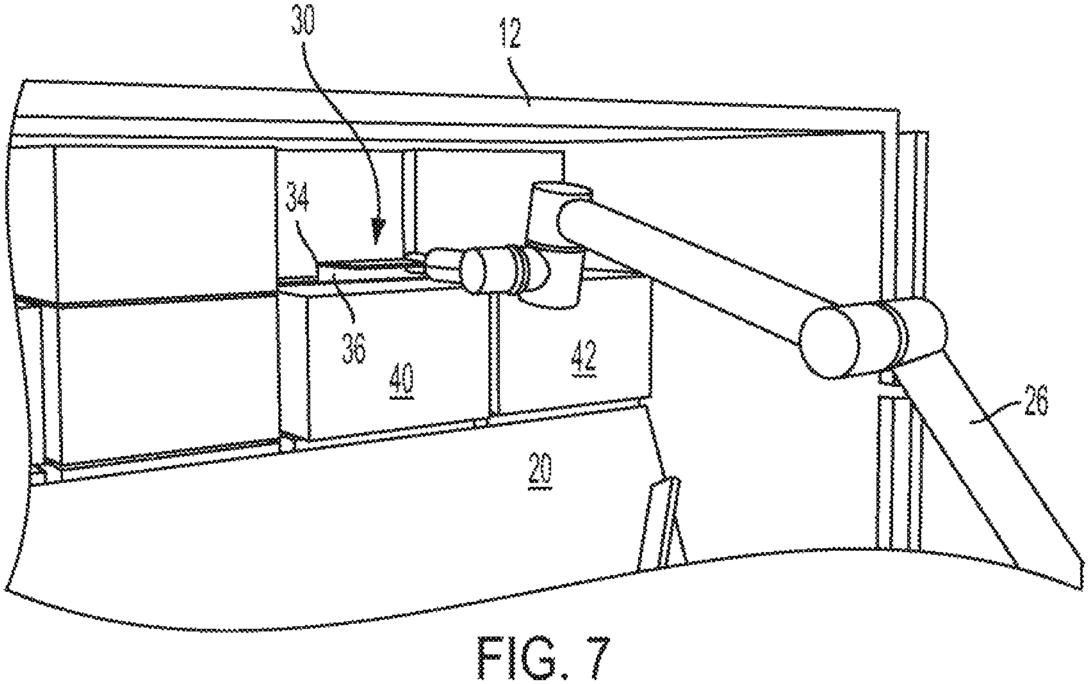
FIG. 7 shows an illustrative diagrammatic enlarged view of the dual-purpose tool in the object processing system of FIG. 4 showing the rake side of the tool engaging an object.
Figure 9:
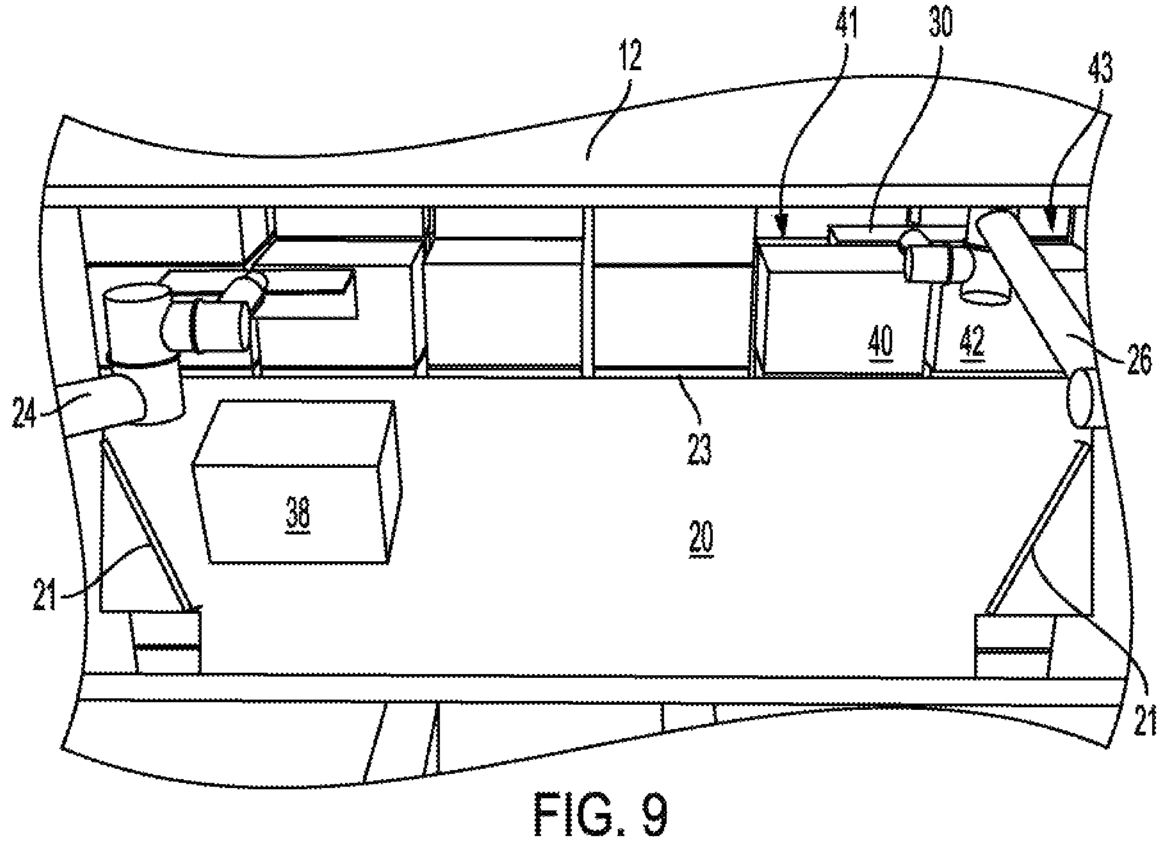
FIG. 9 shows an illustrative diagrammatic view of the object processing system of FIG. 1 with a first dual-purpose tool pulling an object onto the collection panel.
Figure 10:
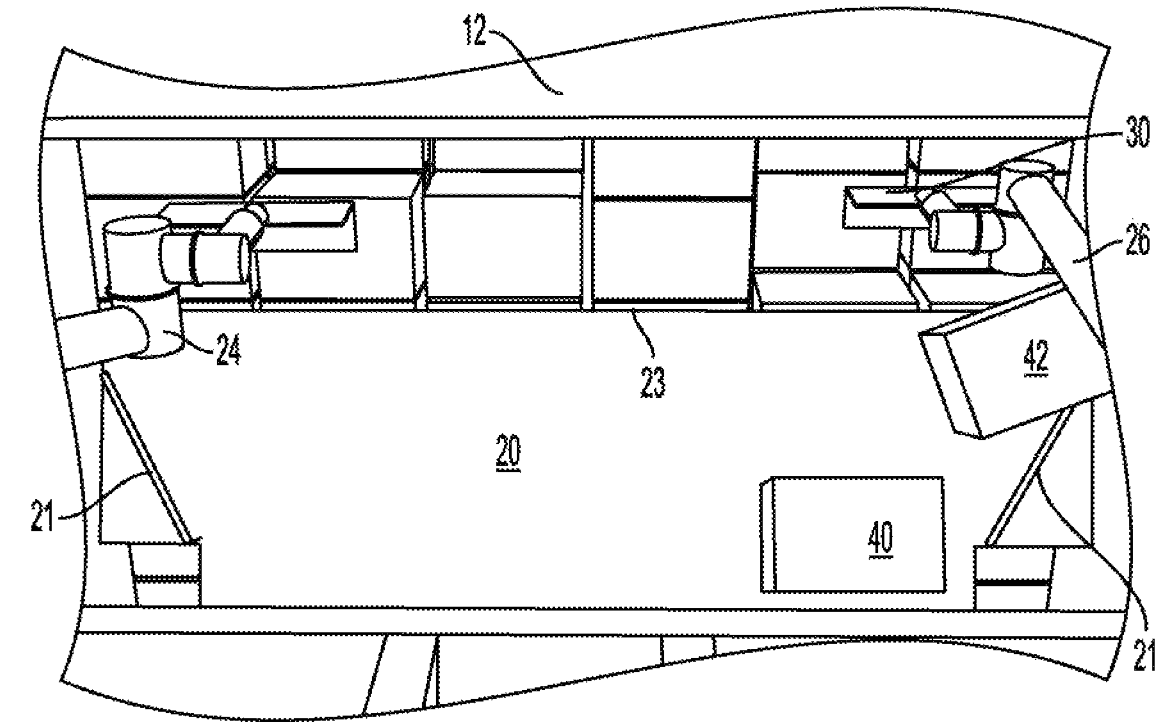
FIG. 10 shows an illustrative diagrammatic view of the object processing system of FIG. 1 with a second dual purpose tool pulling another object onto the collection panel.

Each articulated arm 24, 26 may include a multi-purpose end effector 30 that includes a retrieving tool 34, a distal side of which includes one or more vacuum cups 32 coupled to a vacuum source, and a proximal side 36 that may be used to pull objects over an upper edge of the collection panel 20. In particular, FIG. 4 shows a plurality of vacuum cups 32 on one side of the tool 34. The vacuum cups are employed (with vacuum from a vacuum source) to grasp objects and pull them over the upper edge of the collection panel 20 as shown in FIG. 5. The object (e.g., 38) may then be dropped (as shown in FIG. 9) onto the collection panel by turning off the vacuum to the cups 32. FIG. 6 shows the multi-purpose end effector 30 of the articulated arm 26 (again with the vacuum cups 32 on the tool 34), and FIG. 7 shows the second side 36 of the tool 34 used to pull one or more objects (e.g., 40, 42) over the upper edge of the collection panel 20 (as shown in FIG. 9) and onto which they fall (as shown in FIG. 10), optionally guided by one or more guides 21.

Figure 11A:
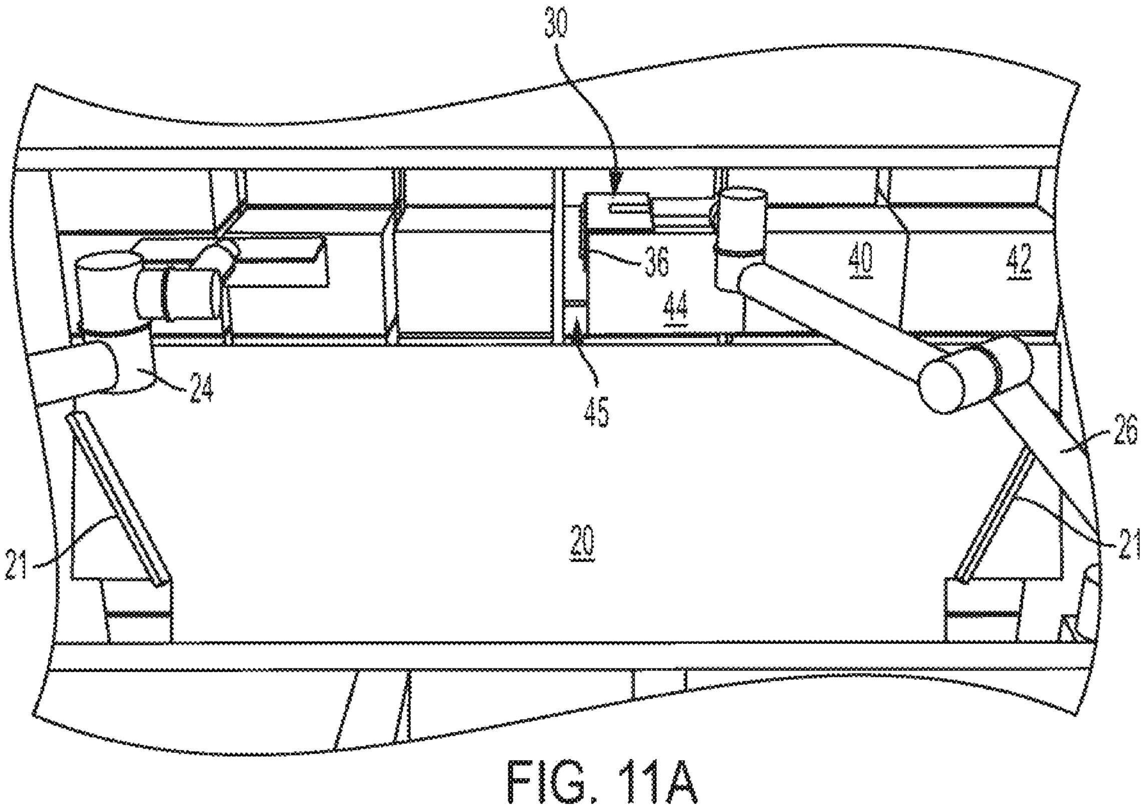
FIGS. 11A and 11B show illustrative diagrammatic end views of the object processing system of FIG. 1 with the end-effector engaging a plurality of objects in a cross-direction (FIG. 11A), and moving the engaged plurality of objects by rotation (FIG. 11B)
Figure 11B:
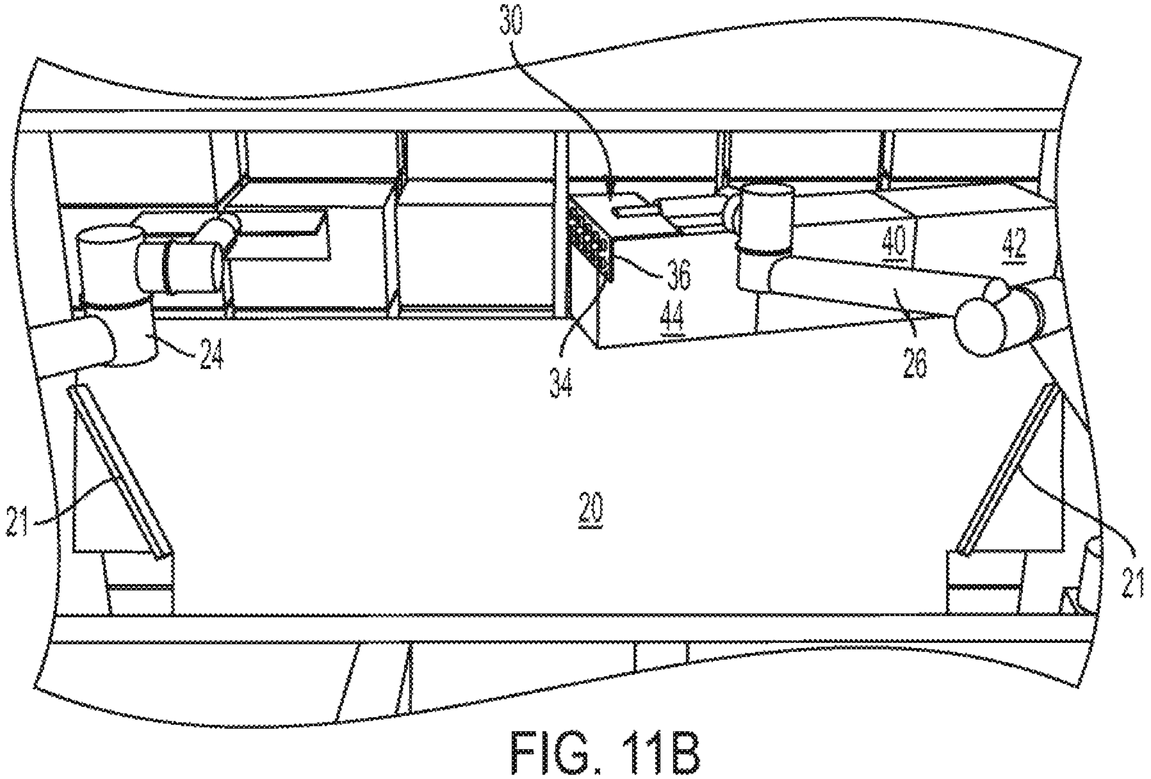

A side of an object may also be engaged to dislodge one or more objects from a stack or set of objects onto the panel. For example, FIG. 11A shows the side 36 of the end effector tool 34 engaging an object 44 from a side of the object. The side of the object 44 may have been associated with having an opening (e.g., 45 as also shown in FIG. 6) adjacent a side of the object 44. Once engaged, the object 44 may be moved sideways by the tool 34, and then rotated toward the articulated arm to draw the object(s) over the panel 20. FIG. 11A shows the tool 34 engaging not only object 44 but also objects 40 and 42, and urging all three objects against each other and against an inner wall of the trailer. FIG. 11B shows all three objects 40, 42, 44 being rotated over the panel 20 such that the objects will fall onto the collection panel 20, optionally engaging guides 21, to be collected by the conveyor 14.

Figure 8:
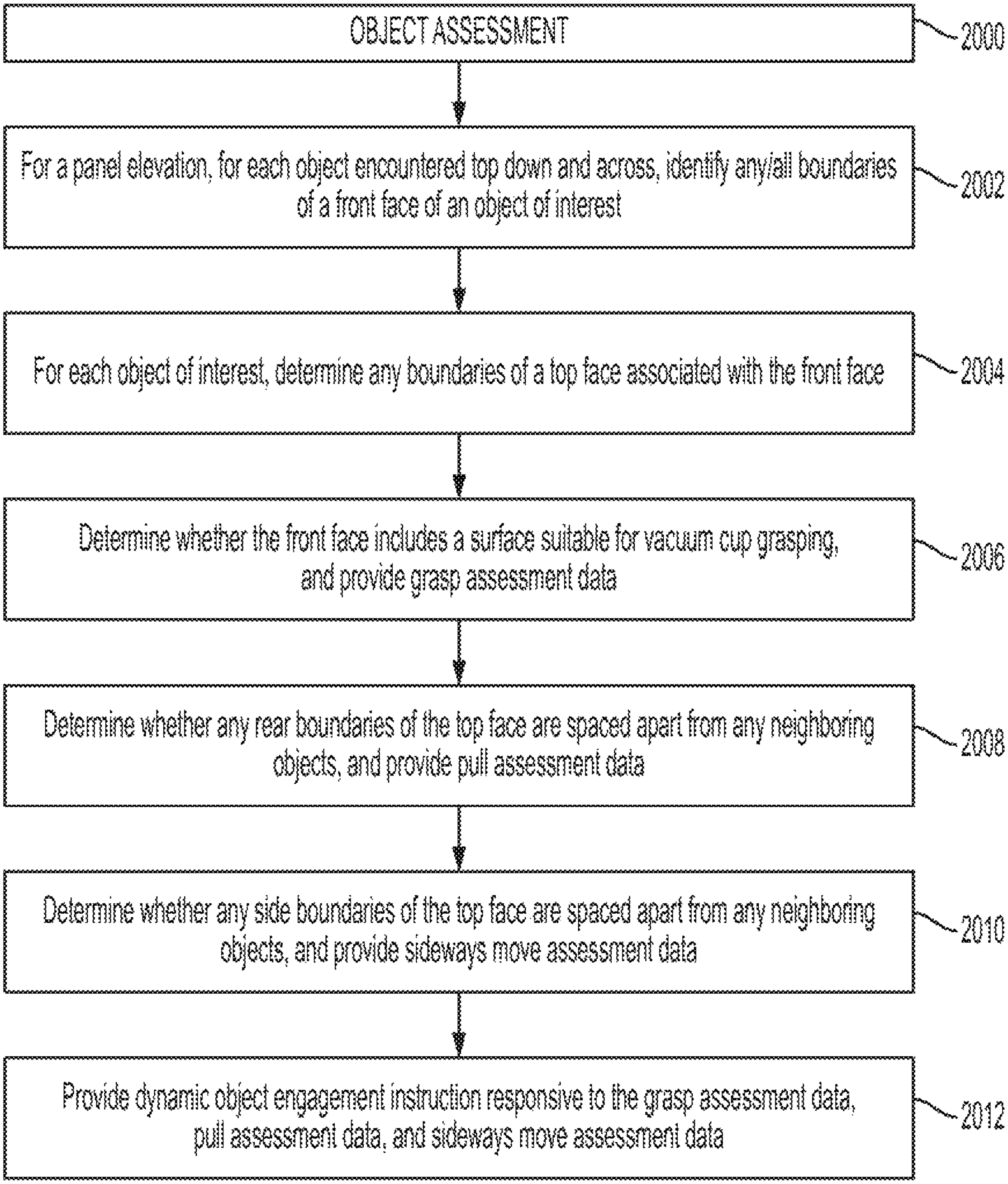
FIG. 8 shows an illustrative diagrammatic functional flow diagram of an object assessment routine in a system in accordance with an aspect of the present invention.

Once the panel is positioned, each facing object is assessed. In particular for example and with reference to FIG. 8, an object assessment routine may begin (step 2000) by evaluating object boundaries. For a panel elevation, for each object encountered top down and across, all boundaries of a front face of each object of interest are identified (step 2002). For each object of interest, the system will also determine any boundaries of a top face associated with the front face (step 2004). With this information, the system may determine whether the front face includes a surface suitable for vacuum cup grasping, and provide grasp assessment data (step 2006). The system may also determine whether any rear boundaries of the top face are spaced apart from any neighboring objects, and provide pull assessment data (step 2008). Additionally, the system may determine whether any side boundaries of the top face are spaced apart from any neighboring objects, and provide sideways move assessment data (step 2010). The system may then provide dynamic object engagement instructions responsive to the grasp assessment data, the pull assessment data, and the sideways move assessment data (step 2012).

Figure 12:
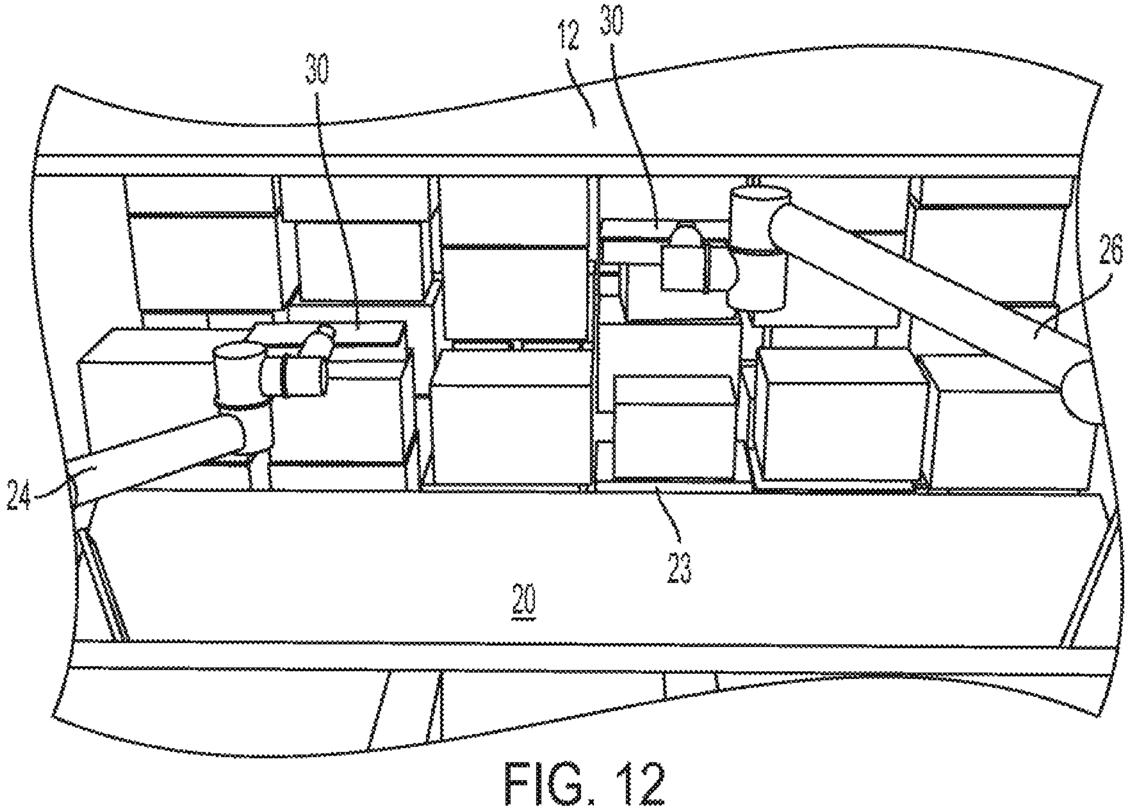
FIG. 12 shows an illustrative diagrammatic end view of the object processing system of FIG. 1 processing an upper level of a trailer.
Figure 13:
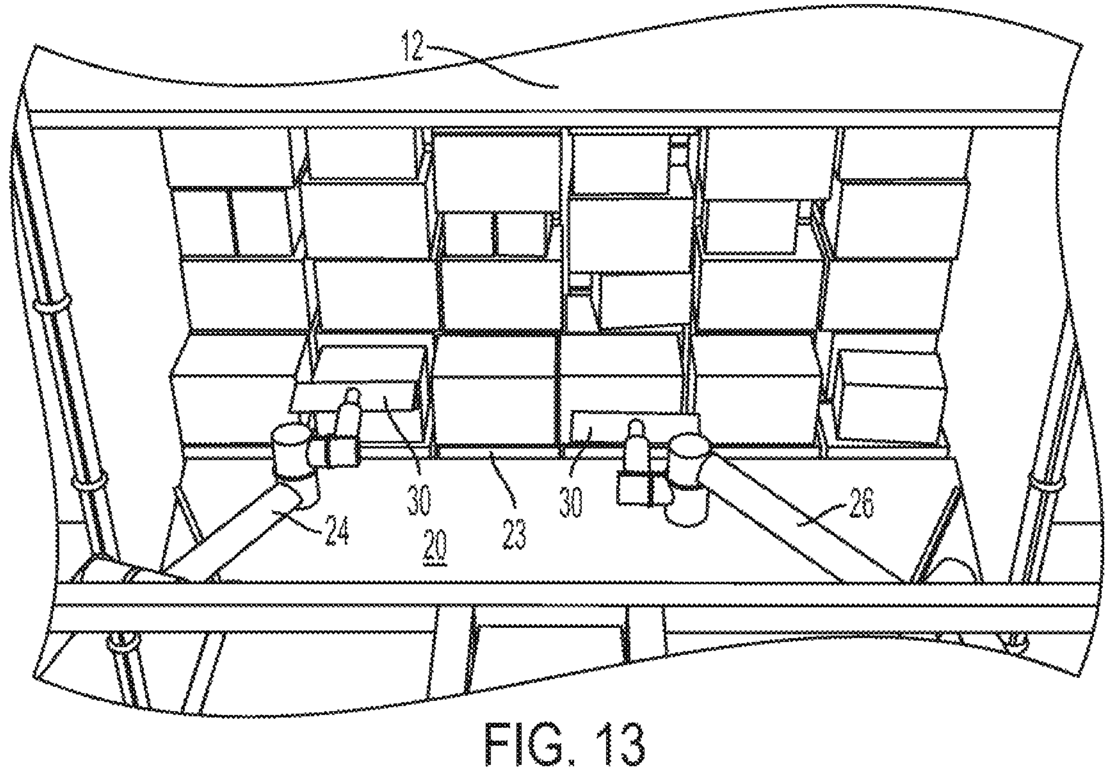
FIG. 13 shows an illustrative diagrammatic end view of the object processing system of FIG. 1 processing a lower level of a trailer with the collection panel lowered.

The top edge 23 of the panel 20 should be positioned to permit objects (e.g., 38, 40, 42) to be moved over the panel 20 so that they may be dropped onto the panel (and thereby urged along the chassis conveyor 14 to the warehouse conveyor 16). The objects may generally be removed from top to bottom of an exposed stack of objects. As the objects are removed (and provided onto the panel 20), the panel is lowered to receive further objects. The panel 20 may be lowered, by pivoting the panel using the assist unit(s) 22 that rotate the panel with respect to a bottom edge thereof, as well as the powered wheels of the chassis 14 that move the dynamic engagement system backward to accommodate the lowering of the panel (as it rotates). In this way, a lower portion of the exposed stack of objects may be processed (as shown in FIG. 12), and when further lowered and moved as discussed above, a still further lower portion of the exposed stack of objects may be processed (as shown in FIG. 13).

Figure 14:
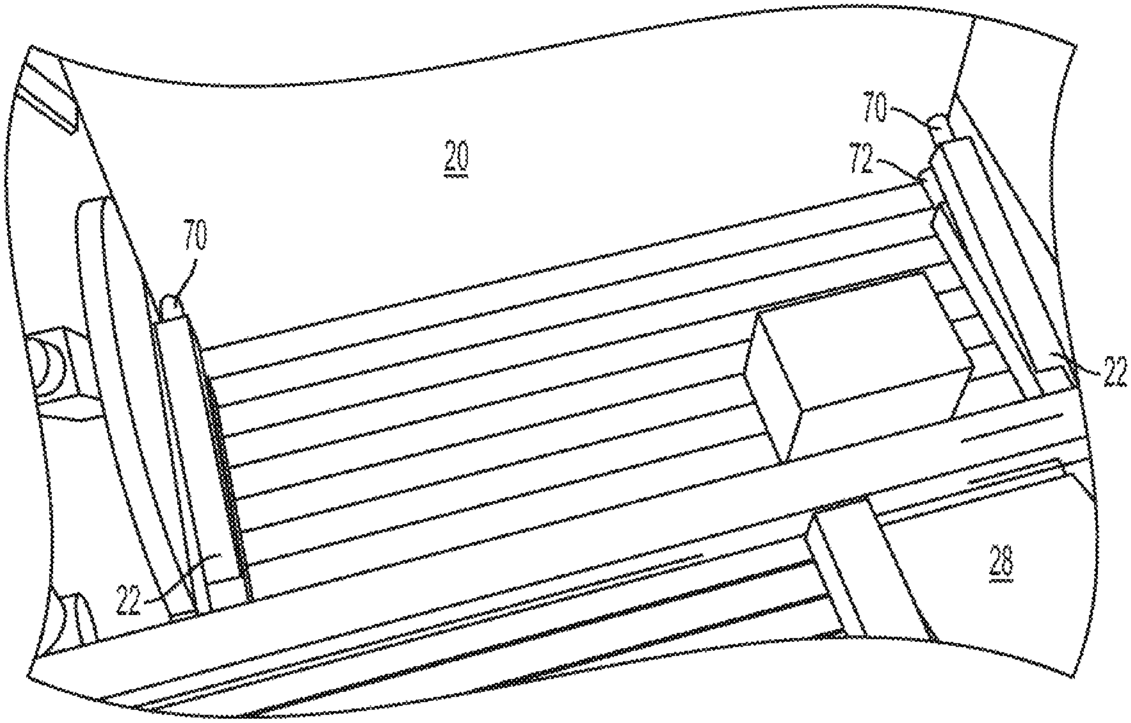
FIG. 14 shows an illustrative diagrammatic elevated view of a rotation control system for a collection panel of an object processing system in accordance with an aspect of the present invention.
Figure 15:
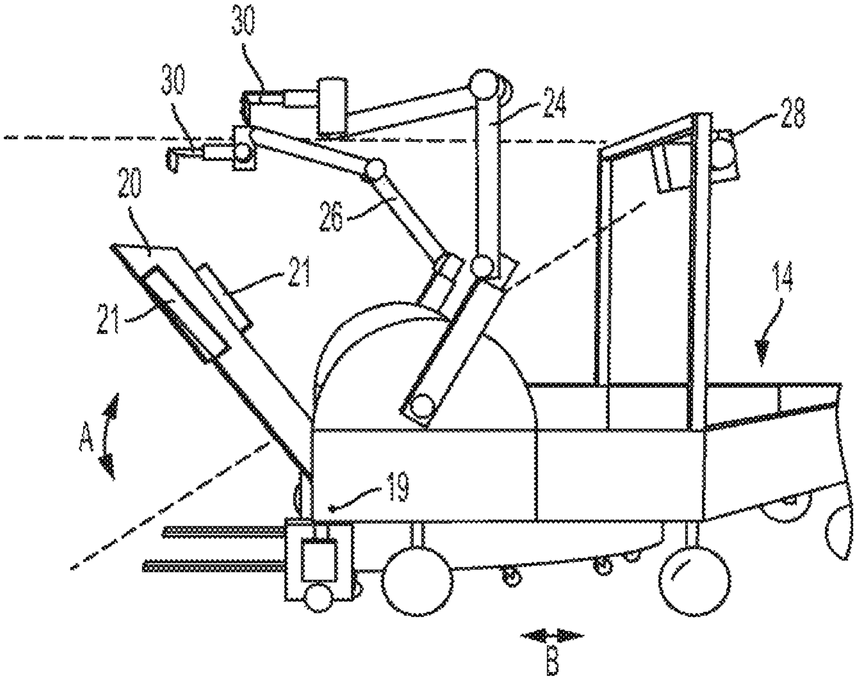
FIG. 15 shows an illustrative diagrammatic side view of the object processing system of FIG. 1 with the collection panel raised.

With reference to FIG. 14, control of the rotation of the panel 20 about the axis 19 (shown in FIG. 15) at the bottom of the panel 20, is provided by the panel assist units 22, each of which includes, for example, an offset pair of actuators 70, 72. Each actuator 70, 72 is offset from the axis 80 by a small difference, and the combination of the movement of the actuators (in cooperation with the actuators 70, 72 on the other side of the engagement system 10) causes the panel 20 to be rotated upward or downward with respect to the conveyor of the chassis 14. One or each of the actuators may further include force torque sensors that measure any forces acting on the panel 20 other than gravity.

The objects may thereby be removed from the trailer using the articulated arms 24, 26 to move objects onto the panel 20 as the panel travels (rotationally and linearly) through the trailer. With reference again to FIGS. 6, 7, 9 and 10, when the perception system 28 detects that an opening (e.g., at 41, 43 in FIGS. 6 and 9) may exist behind objects (e.g., 40, 42) sufficient to receive at least part of a tool 34 of an end effector 30, the system may position a tool of an end effector behind the object such that the second side 36 of the tool 34 may be used to pull one or more objects over the panel 20. Similarly, if an opening is determined to exist adjacent a side face of an object, the system may position a tool of an end effector adjacent the object such that the second side 36 of the tool may be used to urge one or more objects over the panel 20. If an object cannot be moved (or for example cannot be grasped or the end effector tool 34 may not be able to get behind the object), then the system will note this and move on to another object.

Figure 33:
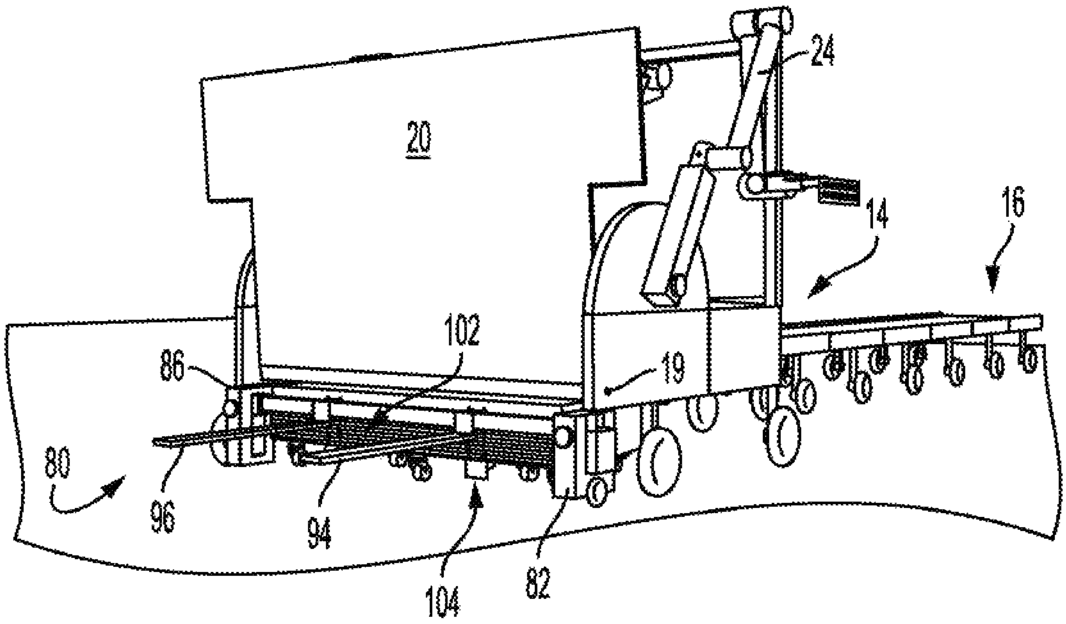
FIG. 33 shows an illustrative diagrammatic enlarged front view of a pallet removal system in accordance with an aspect of the present invention with the pallet forks in a raised position.

Movement of the dynamic engagement system is provided through the one or more processing systems 100 in communication with the perception system 28, the articulated arms 24 26, the rotational assist units and the conveyor wheel actuators (e.g., 15 shown in FIGS. 21 and 33). Rotational movement of the panel 20 about axis 19 is generally shown at A in FIG. 15, and linear movement of the dynamic engagement system is generally shown at B in FIG. 15.

Figure 16:
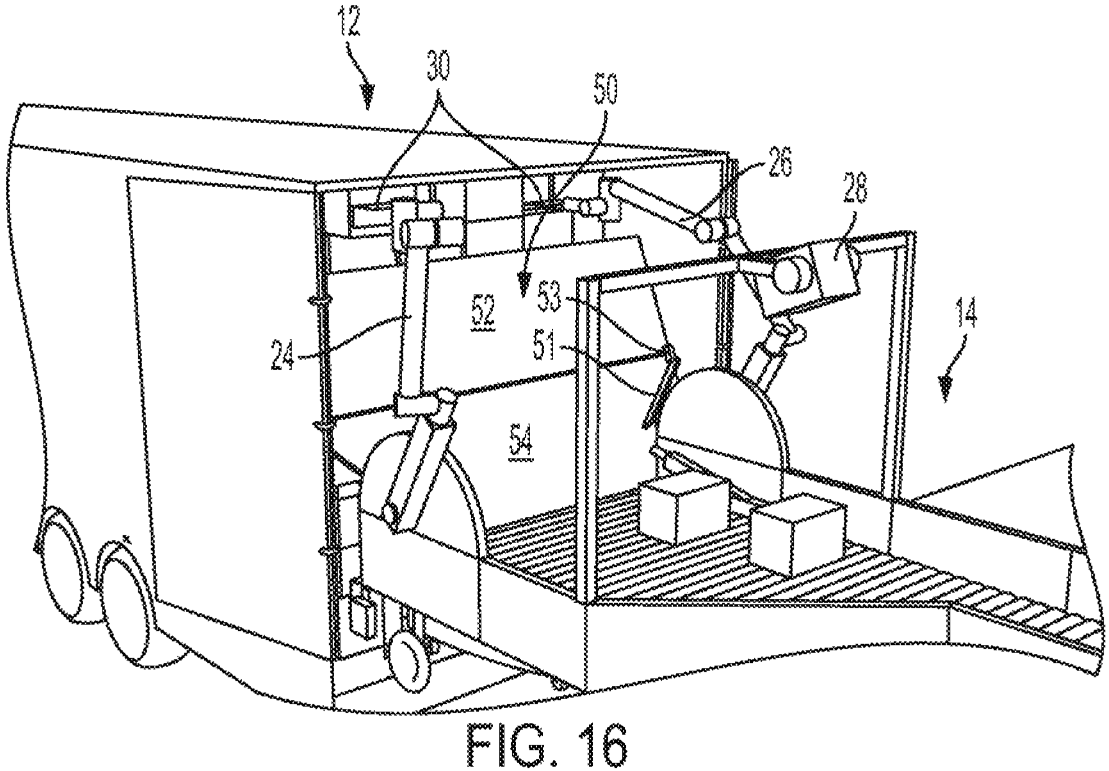
FIG. 16 shows an illustrative diagrammatic view of an object processing system in accordance with another aspect of the present invention that includes a collection panel with two articulated sub-panels in an elevated position.
Figure 17:
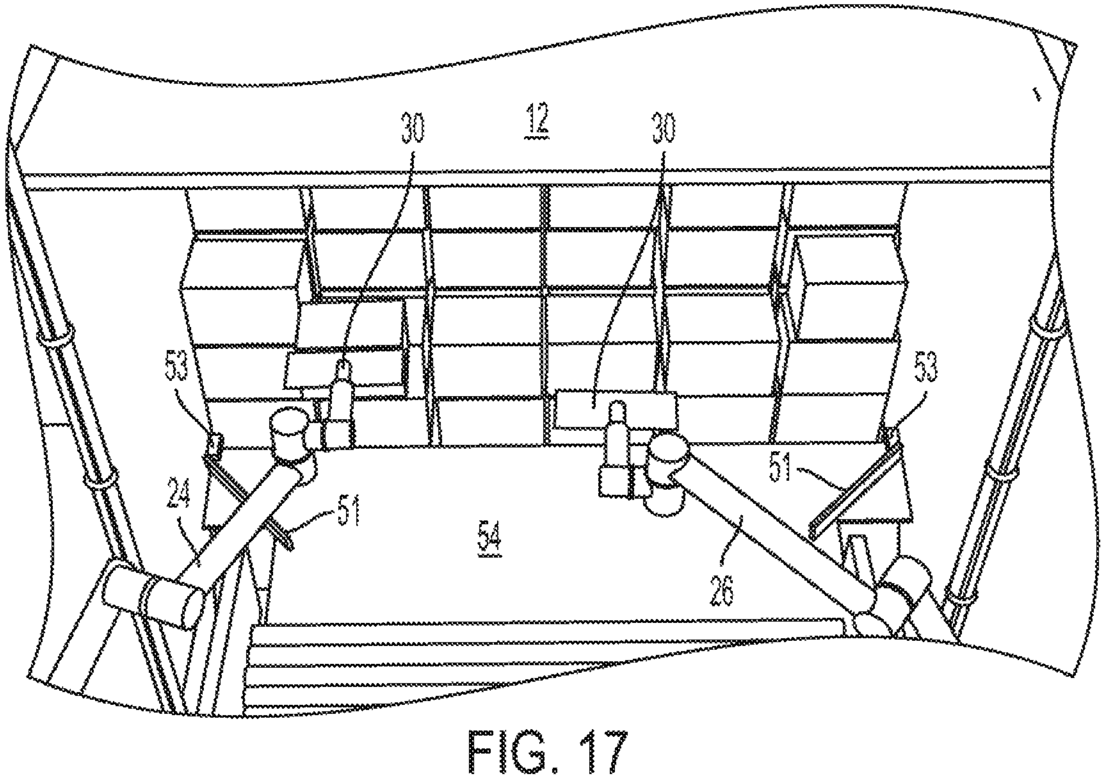
FIG. 17 shows an illustrative diagrammatic view of the object processing system of FIG. 16 with the two sub-panel collection panel in a folded lowered position.
Figure 18:
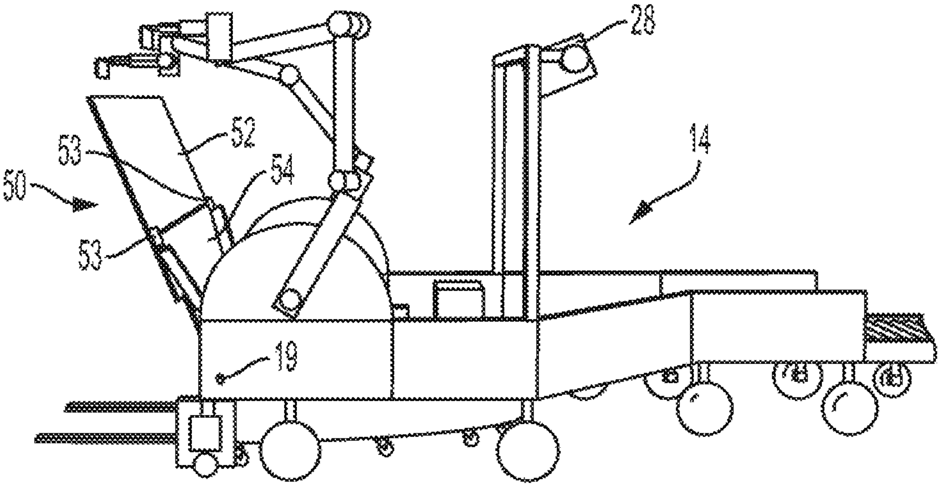
FIG. 18 shows an illustrative diagrammatic side view of the object processing system of FIG. 16 with the two sub-panel collection panel in an elevated position.
Figure 19:
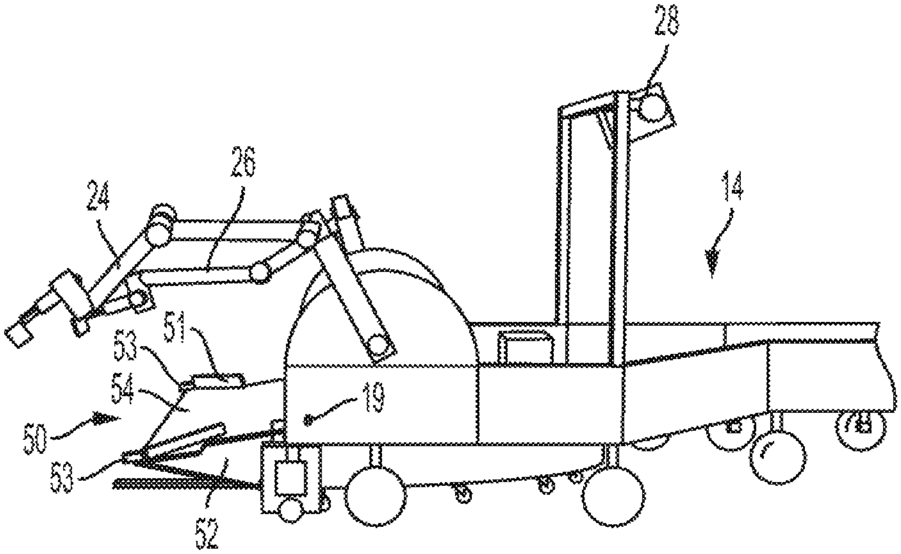
FIG. 19 shows an illustrative diagrammatic side view of the object processing system of FIG. 16 with the two sub-panel collection panel in a lowered position.

In accordance with further aspects, the collection panel may include sub-panels that may be rotatable with respect to one another such that the panel may be collapsed when it is lowered toward the floor of the trailer. This may facilitate reaching objects without extending the articulated arms 24, 26 significant distances to clear the edge of the collection panel. For example, FIG. 16 shows an object processing system that includes a collection panel 50 with two sub-panels 52, 54. When extended to an upper elevation (as shown in FIG. 16), the sub-panels are maintained in an extended position (end-to-end) by actuators 53. The panel 50 may include guides 51 to facilitate dropping objects onto the chassis 14. With reference to FIG. 17, when the actuators 53 release the upper sub-panel 52, it will swing under and be captured on the underside of the sub-panel 54, leaving only the sub-panel to extend toward the objects within the trailer. The outer edge of the sub-panel 54 is therefore now the leading edge of the collection panel 50, permitting the articulated arms 24, 26 to not be required to reach as far away from the chassis 14. FIG. 18 shows a side view of the collection panel 50 in the elevated position, and FIG. 19 shows the collection panel 50 in the folded and lowered position.

Figure 20A:
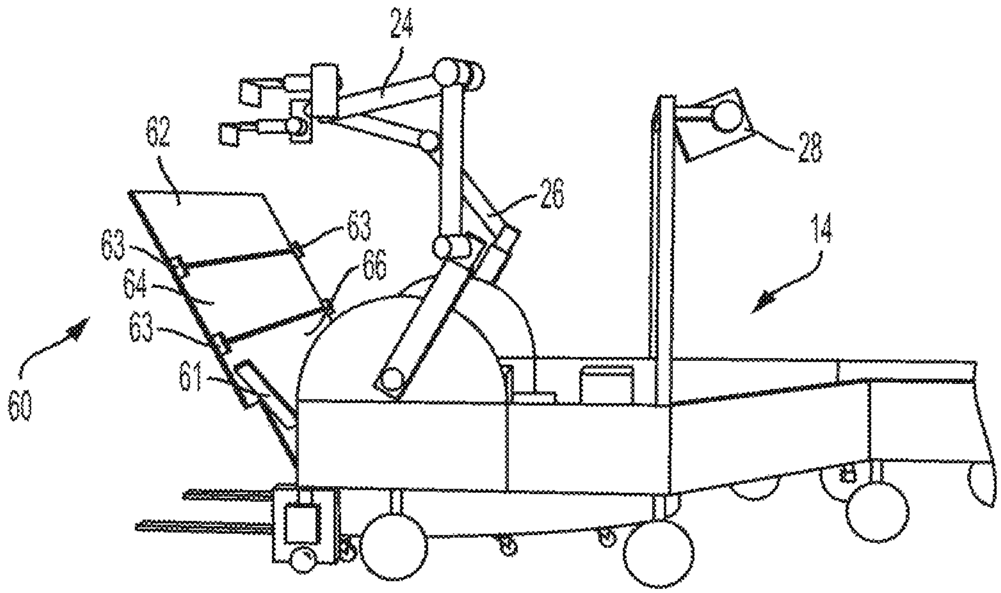
FIGS. 20A and 20B show illustrative diagrammatic side views of the object processing system in accordance with a further aspect of the present invention that includes a folding three sub-panel collection panel shown in an elevated position (shown in FIG. 20A) and in a lowered position (shown in FIG. 20B)
Figure 20B:
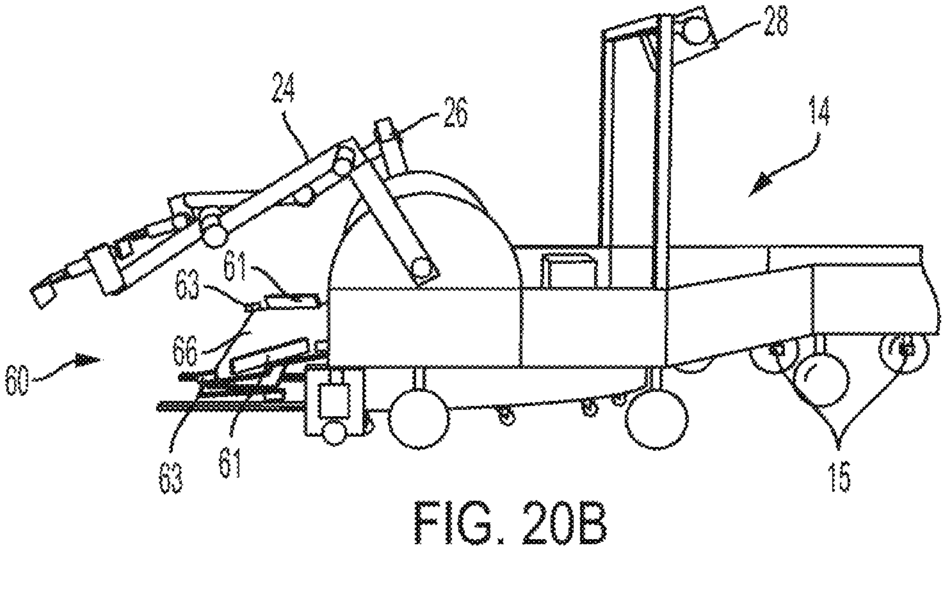

The collection panel may include any number of such folding sub-panels. FIGS. 20A and 20B show side views of an object processing system with a collection panel 60 that includes three sub-panels 62, 64, 66. FIG. 20A shows the collection panel 60 in an elevated position with each sub-panel 62, 64, 66 extending end-to-end, and FIG. 20B shows the collection panel 60 with the sub-panel 62 folded with respect to the sub-panel 64, and the sub-panel 64 folded with respect to the sub-panel 66. In FIG. 20B, the panel assembly is in a lowered position such that the outer edge of the sub-panel 66 is the leading edge of the collection panel 60, permitting the articulated arms 24, 26 to not be required to reach as far away from the chassis 14.

Figure 21A:
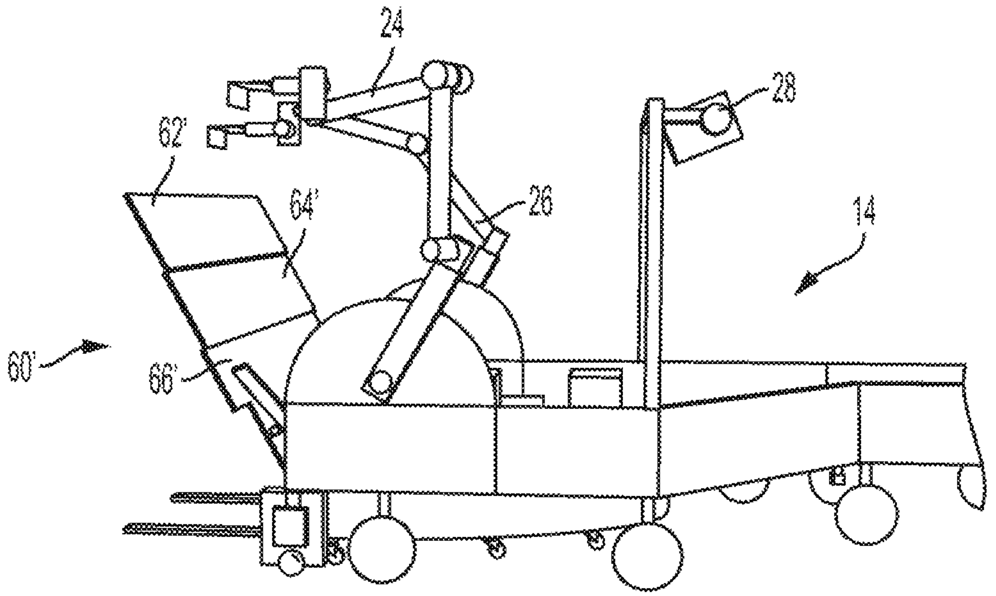
FIGS. 21A and 21B show illustrative diagrammatic side views of the object processing system in accordance with a further aspect of the present invention that includes a telescoping multi-panel collection panel shown in an elevated position (shown in FIG. 21A) and in a lowered position (shown in FIG. 21B)
Figure 21B:
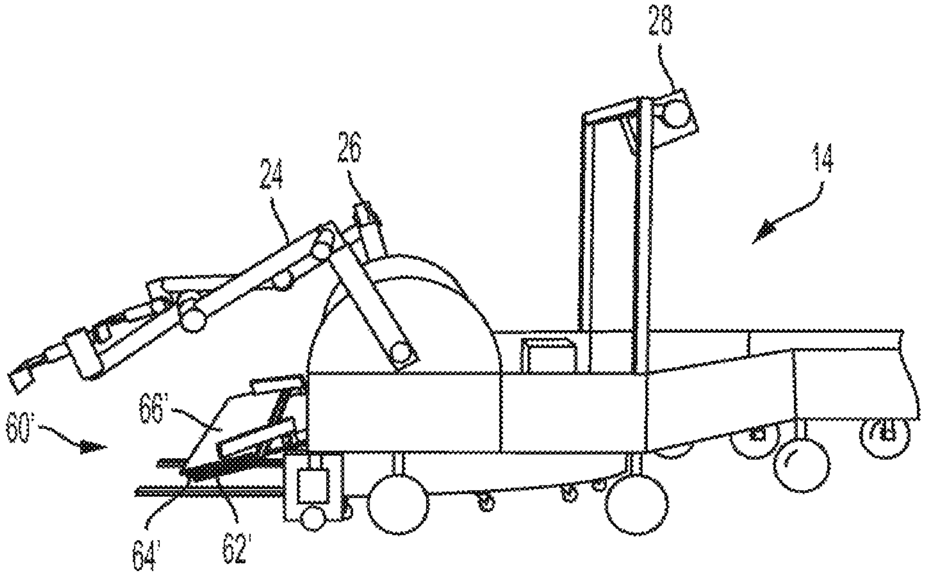

The collection panel may further include any number of telescoping sub-panels. FIGS. 21A and 21B show side views of an object processing system with a collection panel 60' that includes multiple telescoping sub-panels 62', 64', 66'. FIG. 21A shows the collection panel 60' in an elevated position with each sub-panel 62', 64', 66' extending end-to-end, and FIG. 21B shows the collection panel 60' with the sub-panels 62', 64', 66' collapsed in a telescoping manner. Any guides, e.g., 61', are mounted in stand-offs with sufficient clearance to permit the sub-panels to be drawn together. In FIG. 21B, the panel assembly is in a lowered position such that the outer edge of the sub-panel 66' is the leading edge of the collection panel 60', permitting the articulated arms 24, 26 to not be required to reach as far away from the chassis 14.

Figure 22:
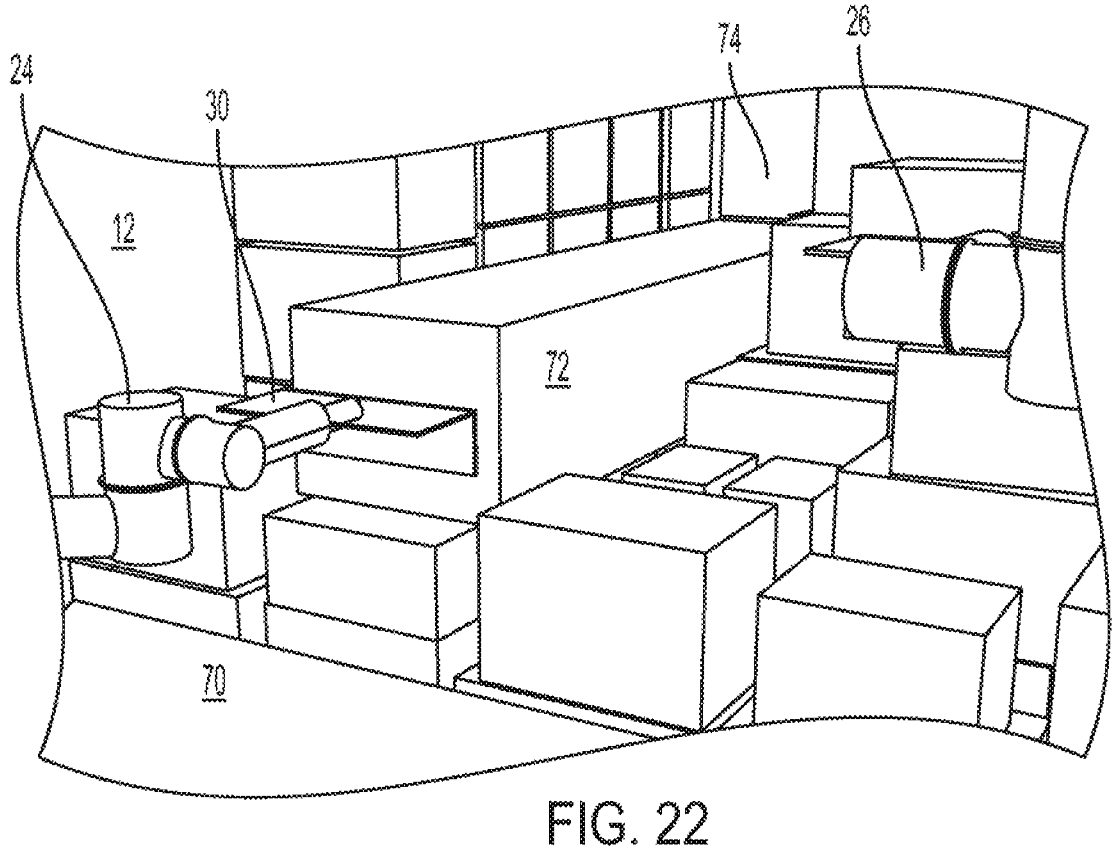
FIG. 22 shows an illustrative diagrammatic view of an object processing system in accordance with an aspect of the present invention engaging a particularly long object.
Figure 23:
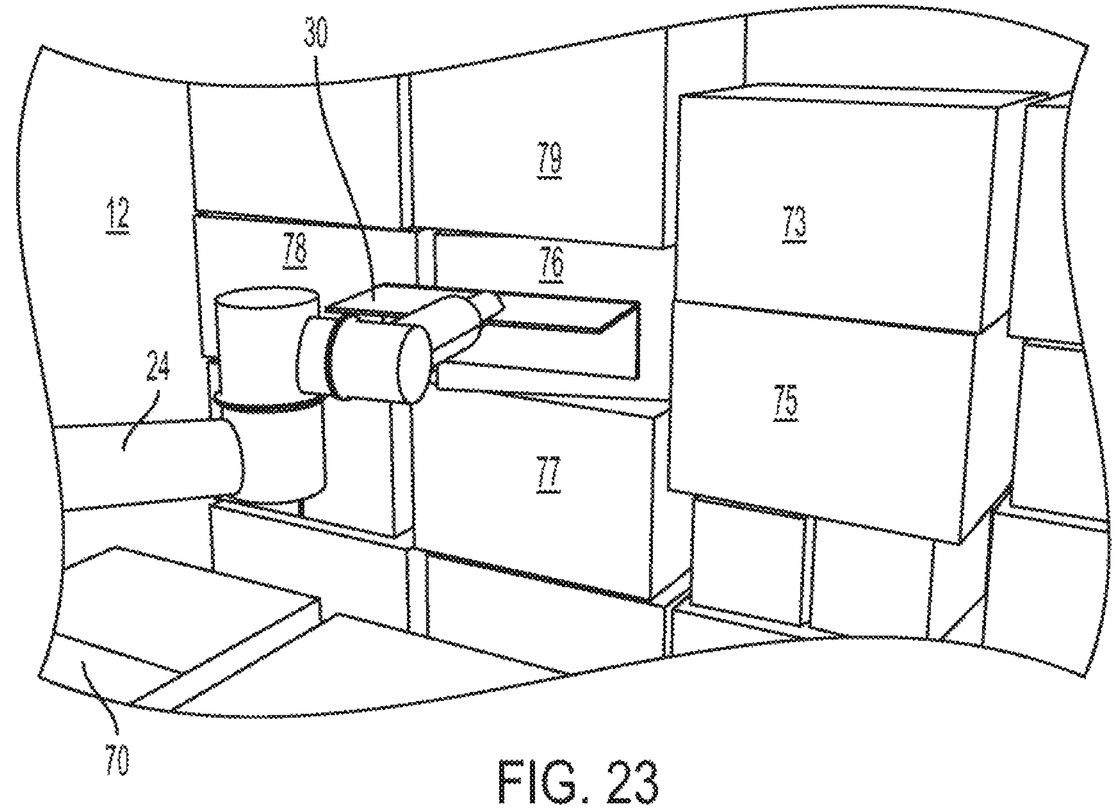
FIG. 23 shows an illustrative diagrammatic view of an object processing system in accordance with an aspect of the present invention engaging an object that is blocked from movement.

In various applications, obstructions may be encountered, and these obstructions may be addressed in any of a variety of ways using modelling and machine learning. For example, a particularly large object may be encountered (e.g., that is very long) as shown in FIG. 22. The long object 72 may be encountered when only an exposed side is visible or it may be apparent when the object is encountered that it will be long (e.g., an exposed end of a kayak). If the system is unable to move an object, it will move on to the task of moving other objects (as discussed a above) until the object is sufficiently free. Additionally, there may be further objects (e.g., 74) on top of the object 72 that are not yet reachable by the articulated arms 24, 26. In further applications, obstructions may be encountered where the object is too heavy to be moved or cannot be freed from surrounding objects. FIG. 23 shows an object 76 that is blocked from being moved by the end-effector 30 by surrounding objects 73, 75, 77, 78, 79.

In either of these situations, the system may apply a maximum normal run-time vacuum pressure, and if this fails, the system may set a signal indicating the need for human personnel intervention. Alternatively, the system may conduct some analyses and develop a removal model. The system may characterize the end-effector movements in terms of the forces and torques it can apply to the load, and then look at the ensemble of objects, the wall, and all the places the effector could be placed, and the forces and torques that could be applied. The system may estimate what any resulting motion would occur. Sometimes an object moves, e.g., lift up, slide out of the wall, or slide onto the platform. Sometimes the object may pivot to a more accessible pose. Sometimes, however, the object may pivot to be cocked and harder to remove, which information should be provided by the model (to be avoided). Sometimes multiple objects move, which is generally ok. Simulation modules characterize the possible outcomes of feasible end-effector actions. Machine learning may further be used to learn a mapping from loads to provide good end-effector behaviors, given the wide variability of events such as the object doesn't move, the object is heavier than anticipated, or the friction is more significant than anticipated, or neighboring objects move in unwanted ways. That modelled outcome could be observed and integrated in the modeling system so that removal models may be developed accordingly.

Figure 24:
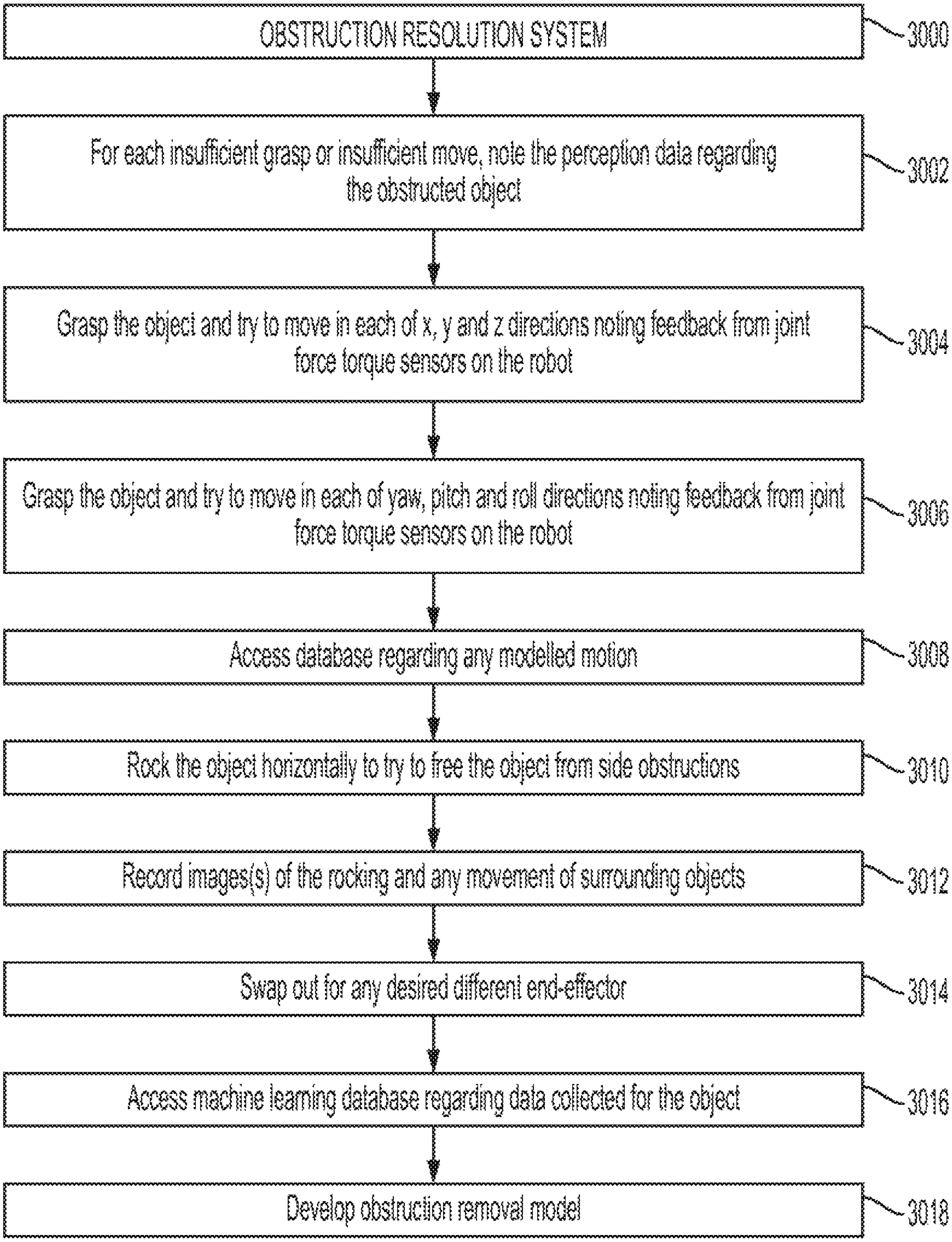
FIG. 24 shows an illustrative diagrammatic functional flow diagram of an obstruction resolution routine in a system in accordance with an aspect of the present invention.
Figure 27:
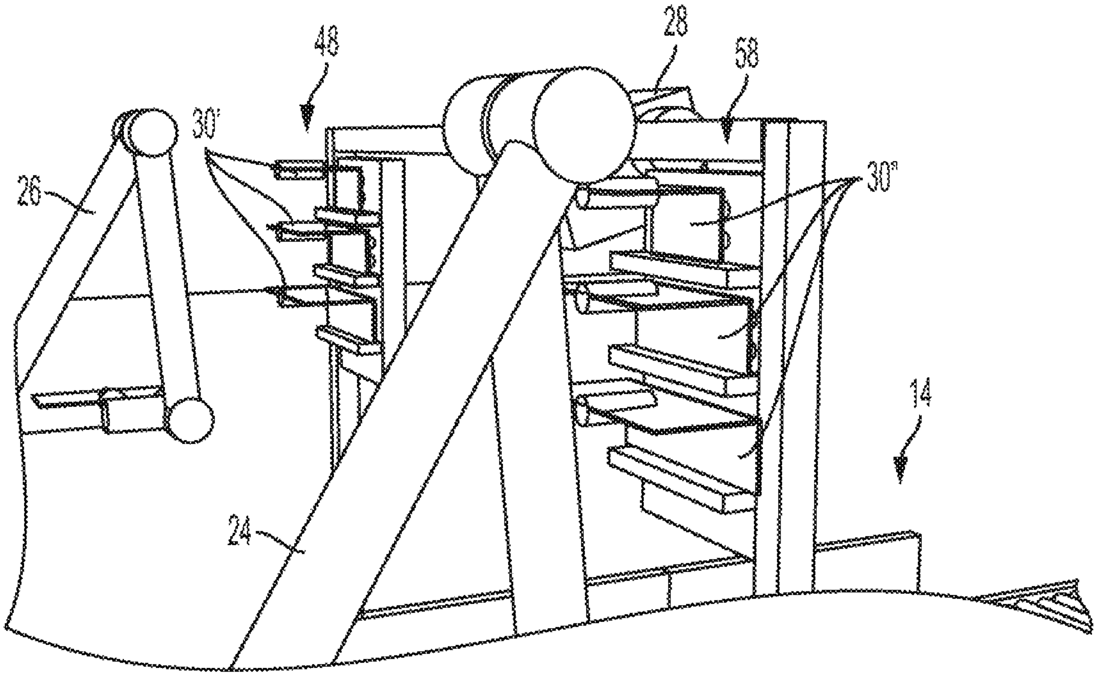
FIG. 27 shows an illustrative diagrammatic view of an object processing system in accordance with an aspect of the present invention that includes a plurality of substitutable end-effector tools for use with the object processing system.
Figure 28:
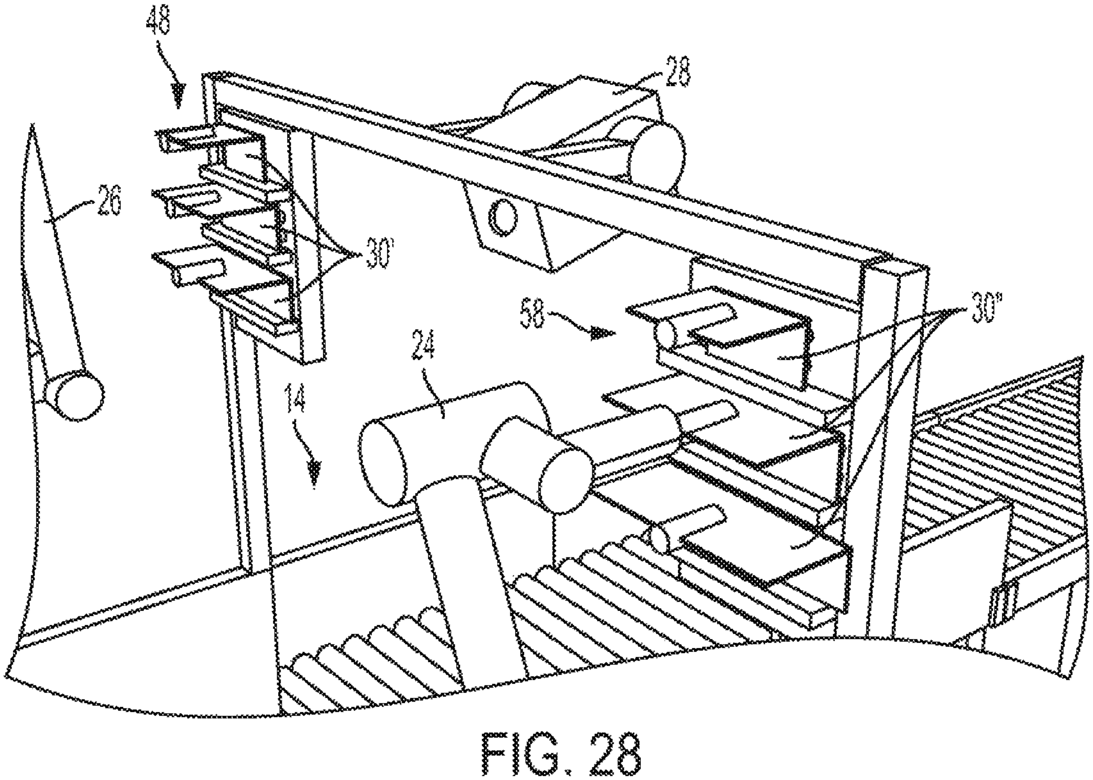
FIG. 28 shows an illustrative diagrammatic view of the object processing system of FIG. 27 including a plurality of substitutable end-effector tools with one end-effector tool being accessed by a programmable motion device.

For example, FIG. 24 shows the functional process of an obstruction resolution routine that may begin (step 3000) by noting for each insufficient grasp or insufficient move, the perception data regarding the obstructed object (step 3002). The system may then grasp the object and try to move in it each of x, y and z directions noting feedback from joint force torque sensors on the robot (step 3004). The system may then try to move the object in each of yaw, pitch and roll directions noting feedback from joint force torque sensors on the robot (step 3006). This sensor feedback information may provide significant data that facilitates not only identifying an efficient removal model, but may help classify objects for facilitating handling unknown objects. The system may then access the database regarding any modelled motion (step 3008), and if no removal model is found, the system may rock the object horizontally to try to free the object from side obstructions (step 3010). Such rocking may sufficiently loosen the object for removal. The system may then record image(s) of the rocking and any movement of surrounding objects (step 3012). If it is determined that a different end-effector should be used, the system may swap out the end-effector for any desired different end-effector (step 3014) as also shown in FIGS. 27 and 28. The system may then access machine learning database regarding data collected for the object (step 3016) and the develop obstruction removal model (step 3018).

Figure 25:
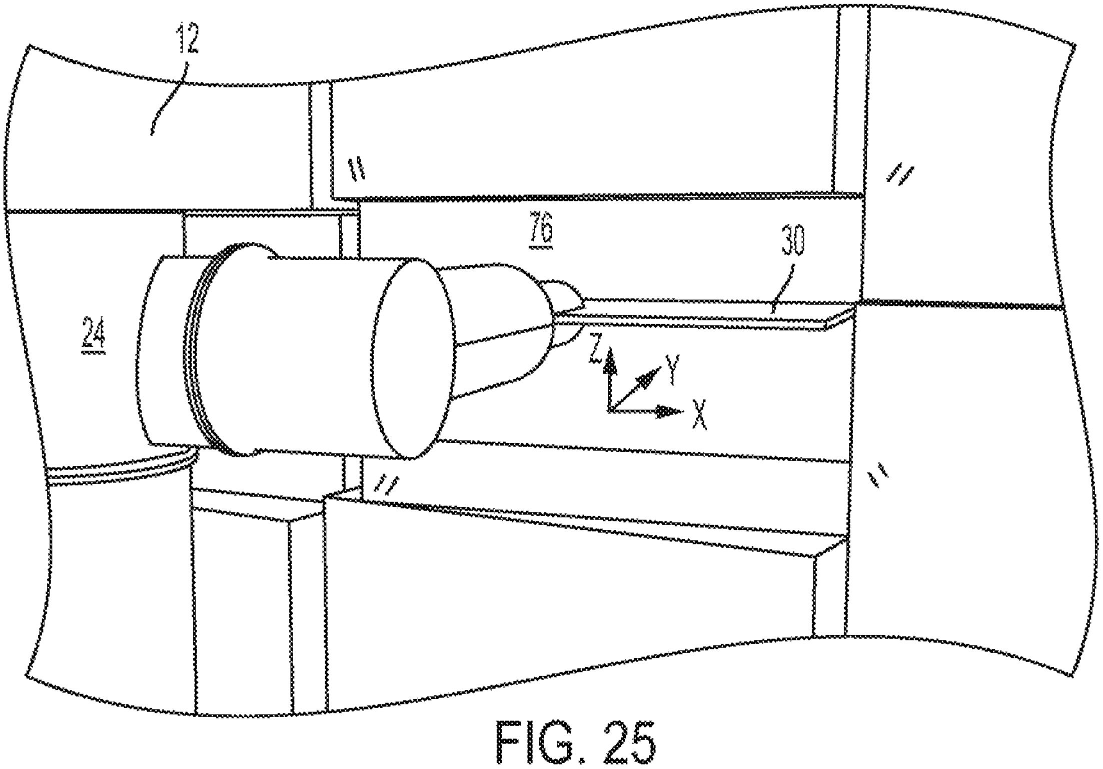
FIG. 25 shows an illustrative diagrammatic view of an obstructed object being subjected to applied forces in each of three mutually orthogonal directions.
Figure 26:
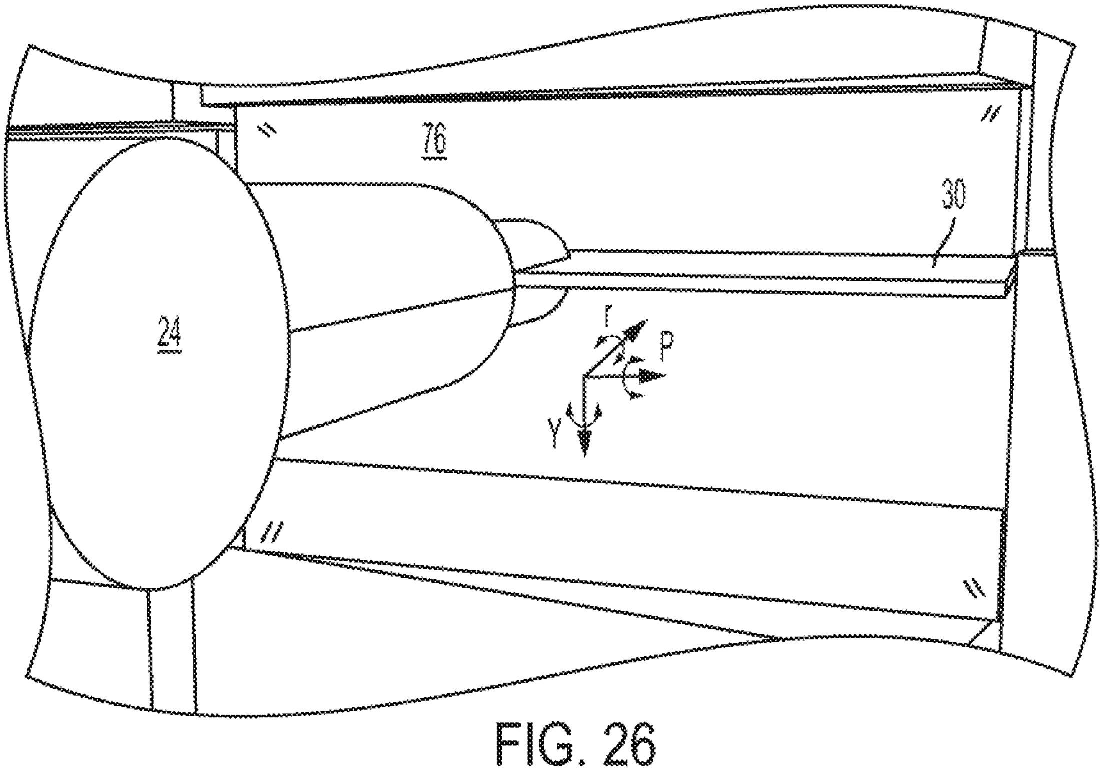
FIG. 26 shows an illustrative diagrammatic view of the obstructed object of FIG. 25 being subjected to forces in each of yaw, pitch and roll rotational directions.

With reference to FIG. 25, for example, the end-effector 30 may try to move an obstructed object 76 in each of x, y, and z directions, noting the feedback on joint force torque sensors on the articulated arm. With reference to FIG. 26, the end-effector 30 may further try to move the obstructed object 76 in each of yaw, pitch and roll directions, again noting the feedback on joint force torque sensors on the articulated arm. This non-visually observable feedback information may provide valuable insights for the machine learning system in developing efficient removal models.

FIG. 27 shows an object processing system in accordance with an aspect of the present invention as discussed above that includes a pair of end-effector swap racks 48, 58 on which a plurality of further end-effectors 30', 30" may be provided for use by the articulated arms 24, 26. As shown in FIG. 28, each articulated arm (e.g., 24 as shown) may access each further end-effector for automatically swapping out the end-effector as the removal model may require.

Figure 29:
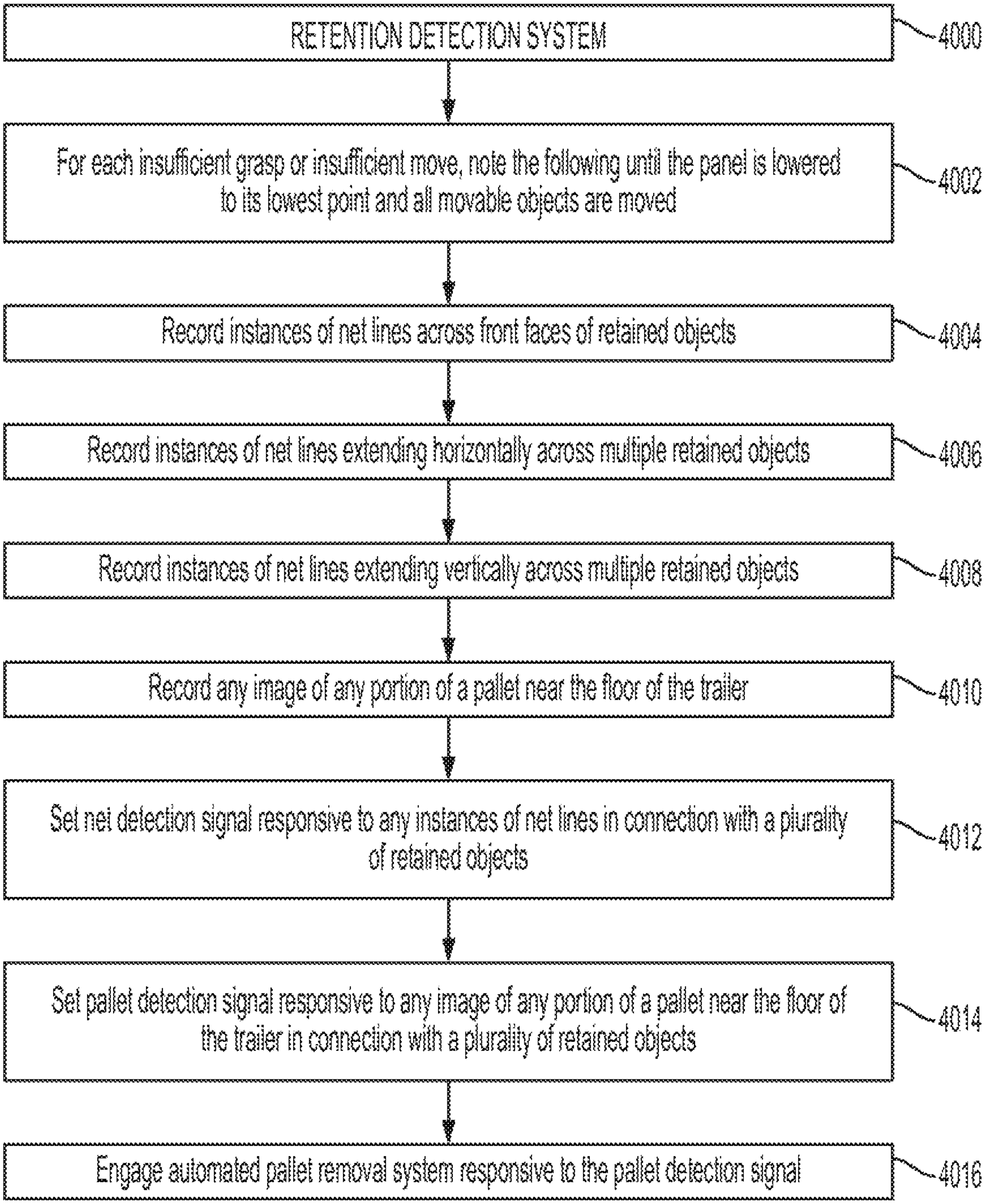
FIG. 29 shows an illustrative diagrammatic elevated view of a retention detection system in an object processing system in accordance with an aspect of the present invention.

A retention detection system may also be employed to determine whether a retention system is present within a trailer (e.g., such as a restraining net, wall, or set of objects that are wrapped together, for example and provided on a pallet). With reference to FIG. 29, the retention detection system begins (step 4000) by being triggered for each object that may not be sufficiently processed. In particular, for each insufficient grasp of an object or insufficient attempted move of an object, the following data is collected (step 4002). This is done until the panel is lowered to its lowest point and all movable objects are moved. The system then records instances of net lines across front faces of retained objects (step 4004), and then record instances of net lines extending horizontally across multiple retained objects (step 4006). The system then records instances of net lines extending vertically across multiple retained objects (step 4008), and then records any image of any portion of a pallet near the floor of the trailer (step 4010). The system them sets a net detection signal responsive to any instances of net lines in connection with a plurality of retained objects (step 4012), and then sets a pallet detection signal responsive to any image of any portion of a pallet near the floor of the trailer in connection with a plurality of retained objects (step 4014). The system then engages the automated pallet removal system responsive to the pallet detection signal (step 4016).

Figure 30:
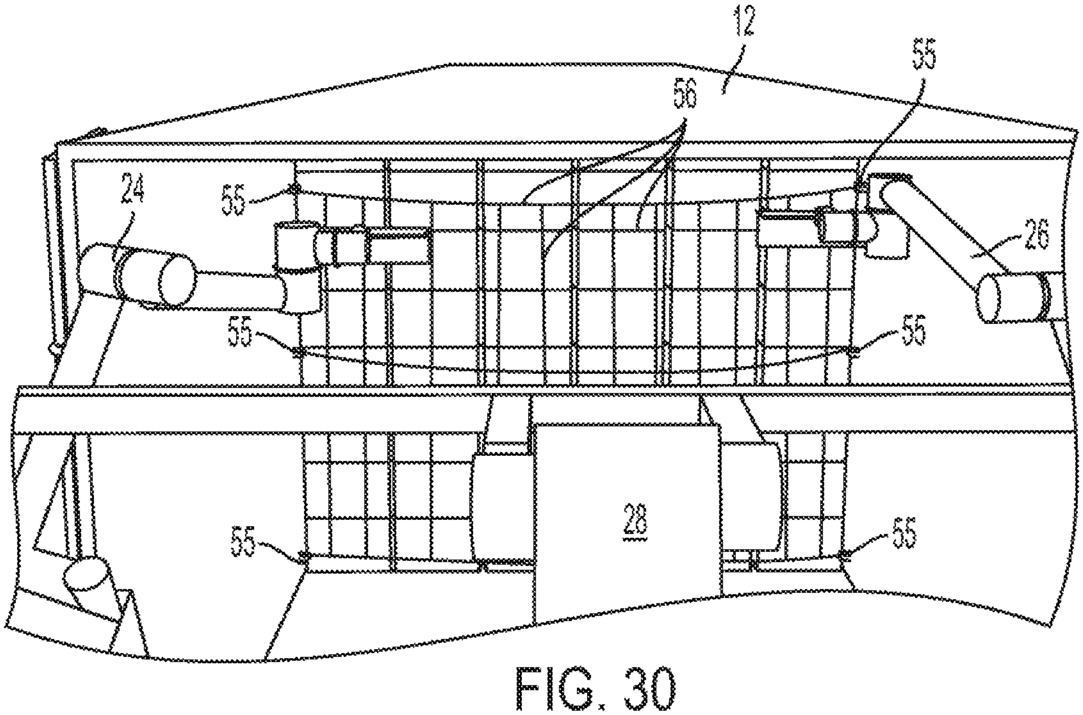
FIG. 30 shows an illustrative diagrammatic end view of an object processing system in accordance with an aspect of the present invention encountering a netting within a trailer.

During the removal of objects therefore, if any object may not be removed (either may not be able to be grasped properly, or may not be movable due to an obstruction), the system will run a retaining detection routine to determine whether any of the objects are retained within the trailer. The system will continue, moving to a next object until all objects that may be moved are moved onto the panel 20. Each time an object is identified as being not movable (again either not graspable or is blocked), the system will run the retaining detection routine. The retaining detection routine may be run on the one or more computer processing systems 100 with perception data from the perception unit 28, and may analyze image data in combination with object grasp attempt data to identify whether any retention system is inhibiting the removal of objects from the trailer. If a retaining feature is present, the system will run for each object that is found to be not movable. A combination of the results of the multiple executions of the routine provides duplicative results that should confirm the type of retaining feature present. For example, FIG. 30 shows a netting 56 that spans the width and height of the trailer and are attached to mounts 55. Such netting 56 may be installed manually upon loading of the trailer, and may be required to be removed manually with unpacking the trailer. An alarm (light and/or sound) will be triggered if a netting is detected by the system, and removed by human personnel.

Figure 31:
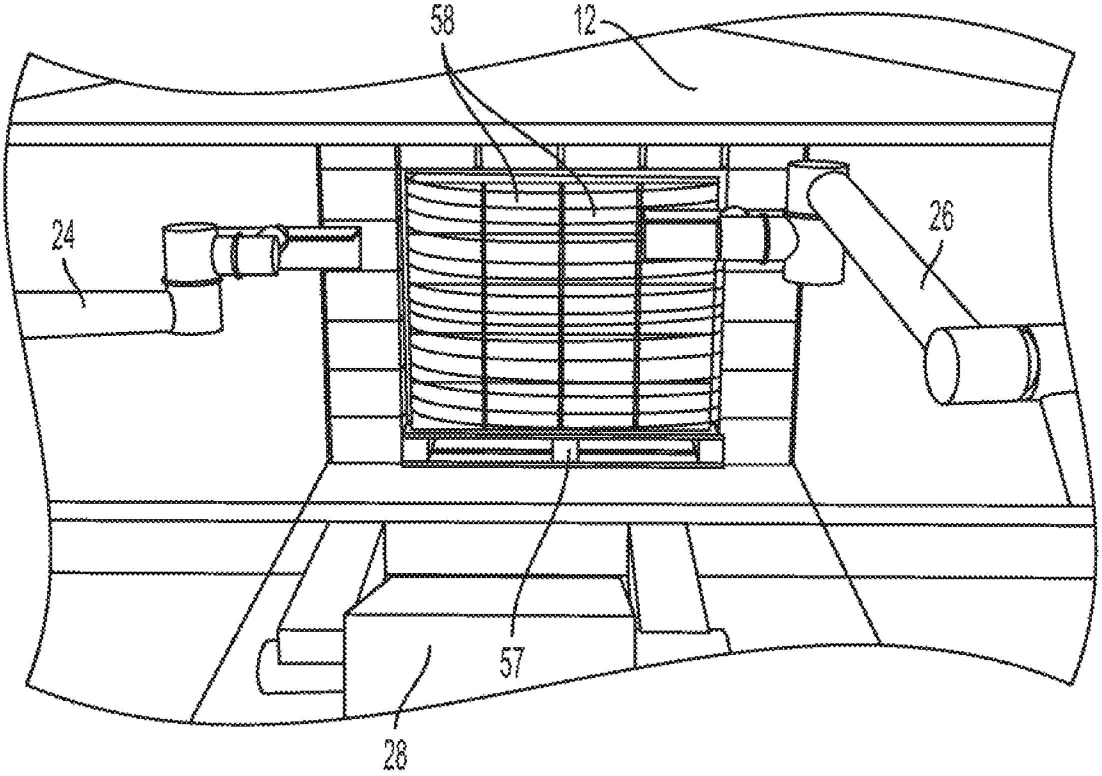
FIG. 31 shows an illustrative diagrammatic end view of an object processing system in accordance with an aspect of the present invention encountering a loaded wrapped pallet within a trailer.

Alternatively, as the movable objects are removed, an image of an exposed end of a pallet at the floor of the trailer may be detected. The objects on the pallet may be wrapped (accounting for the system being unable to move individual objects), and upon detection of the pallet, the system will trigger a pallet removal command. FIG. 31 for example, shows a pallet 57 on which objects are provided within a wrapping (e.g., clear plastic) 58. Objects within the wrapping 58 on the pallet will not be movable by the end effector 30, and the system will run the retaining detection routine. Once the bottom of the trailer becomes clear, the pallet 657 will become visible to the perception system 28, and the system will register that a pallet is present. Again, an alarm (light and/or sound) will be triggered if a pallet is detected by the system, and the pallet and its associated objects may be removed by human personnel.

Figure 32:
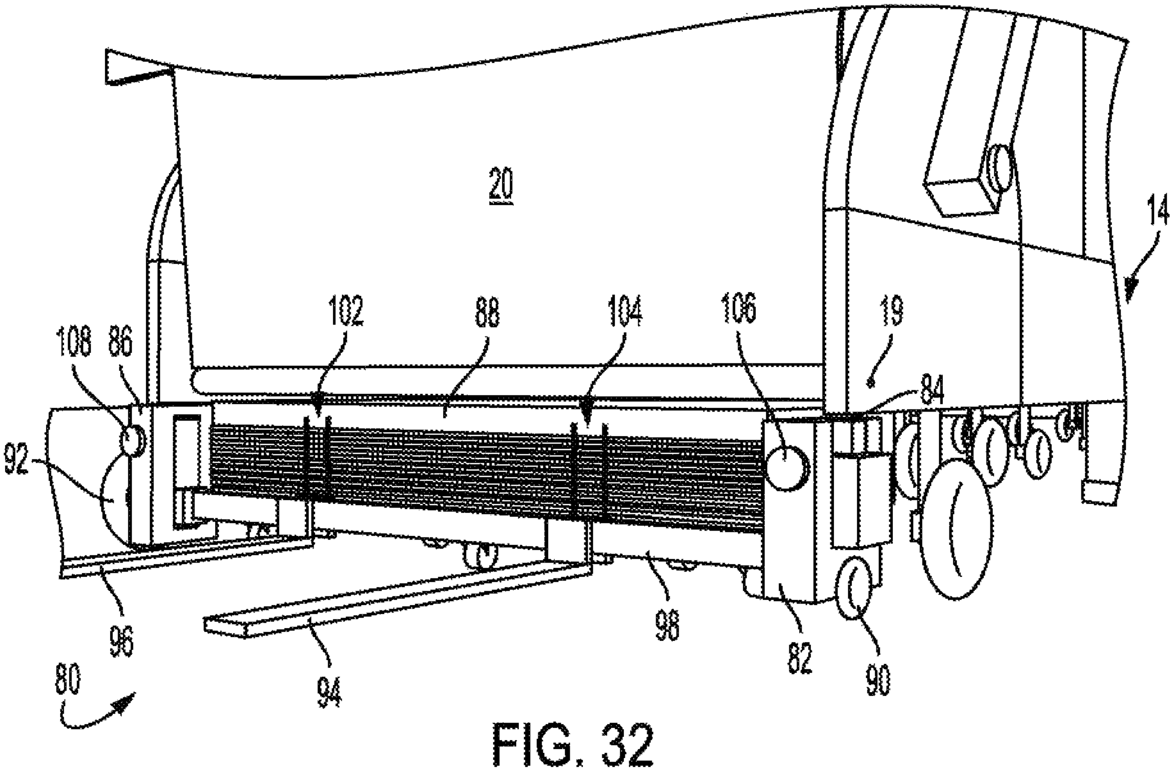
FIG. 32 shows an illustrative diagrammatic enlarged front view of a pallet removal system in accordance with an aspect of the present invention with the pallet forks in a lowered position.

In accordance with further aspects, when the system detects the presence of a pallet as above, the system may employ an automated pallet removal system. In particular and with reference to FIG. 32, the system may include a pallet removal system 80 that includes a fixed pivot end 82 that rotates with respect to the chassis conveyor 14 by a pivot pin 84, and a rotating swing end 86, both of which ends 82, 86 being coupled to a swing bar 88. The swing bar 88 is attached to a counterweight portion 110 (shown in FIG. 35) that is supported by a plurality of heavy-duty casters 112. The pallet removal system 80 also includes a pair of forks 94, 96 that are mounted to a cross bar 98, and the cross bar 98 may be actively raised or lowered along tracks 102, 104 as controlled by the one or more computer processing systems. FIG. 33 shows the forks 94, 96 and the cross bar 98 in the raised position. The pallet removal system 80 may also include one or more perception systems 106, 108 to aid the pallet removal process (the perception system 28 may be blocked by the panel 20).

Figure 34:
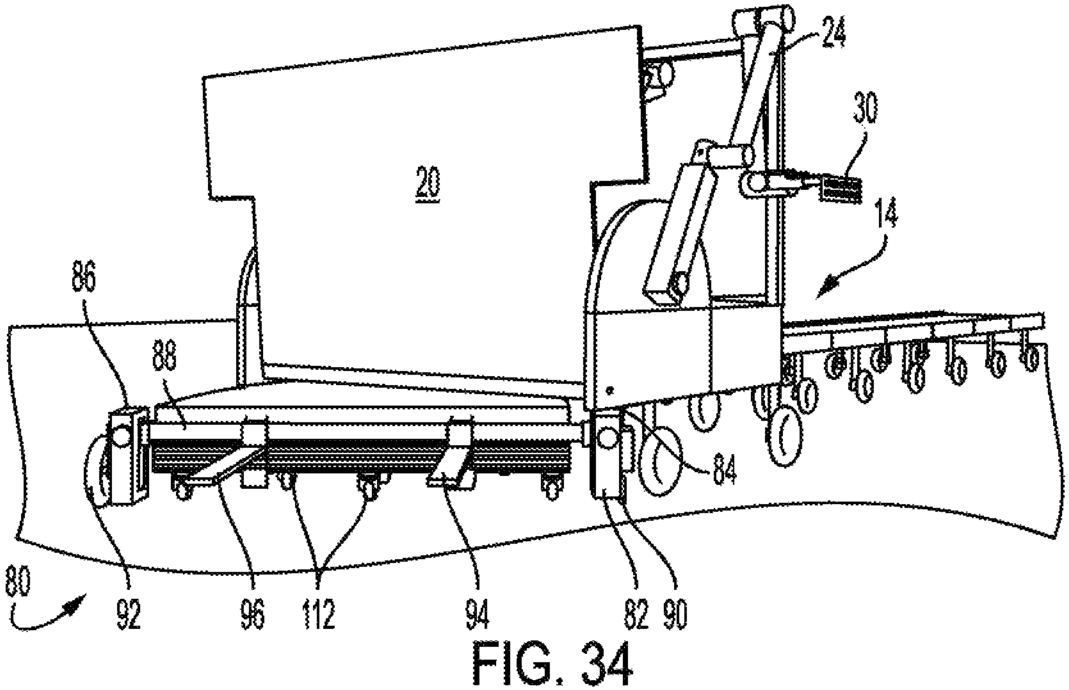
FIG. 34 shows an illustrative diagrammatic enlarged front view of the pallet removal system of FIG. 32 with the pallet removal system in a partially rotated position.
Figure 35:
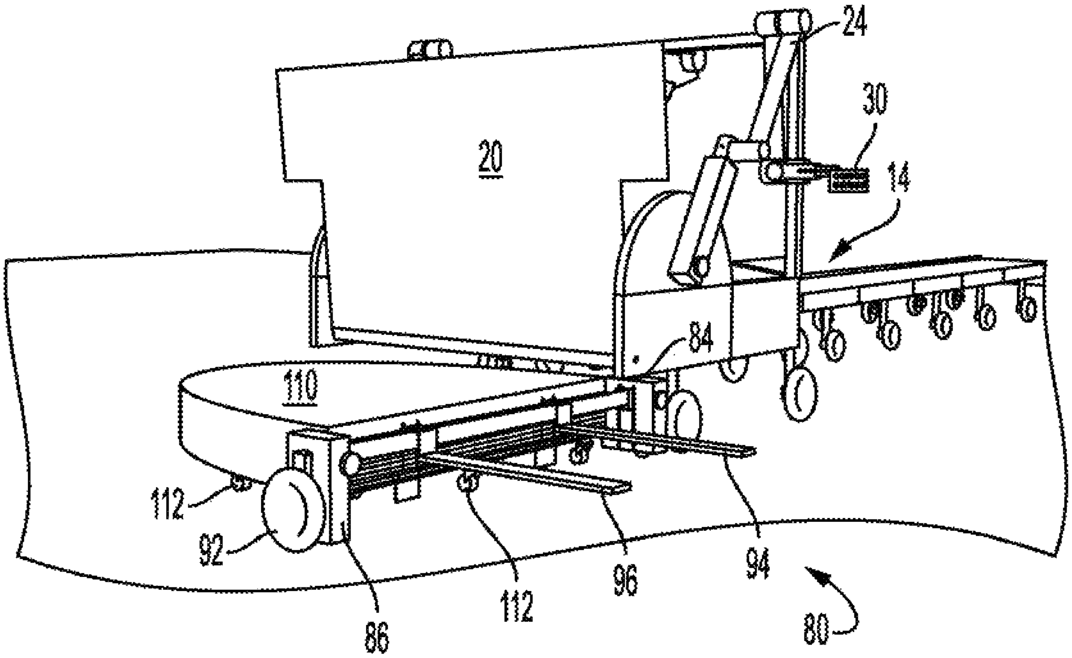
FIG. 35 shows an illustrative diagrammatic enlarged front view of the pallet removal system of FIG. 32 with the pallet removal system in a fully rotated position.
Figure 36:
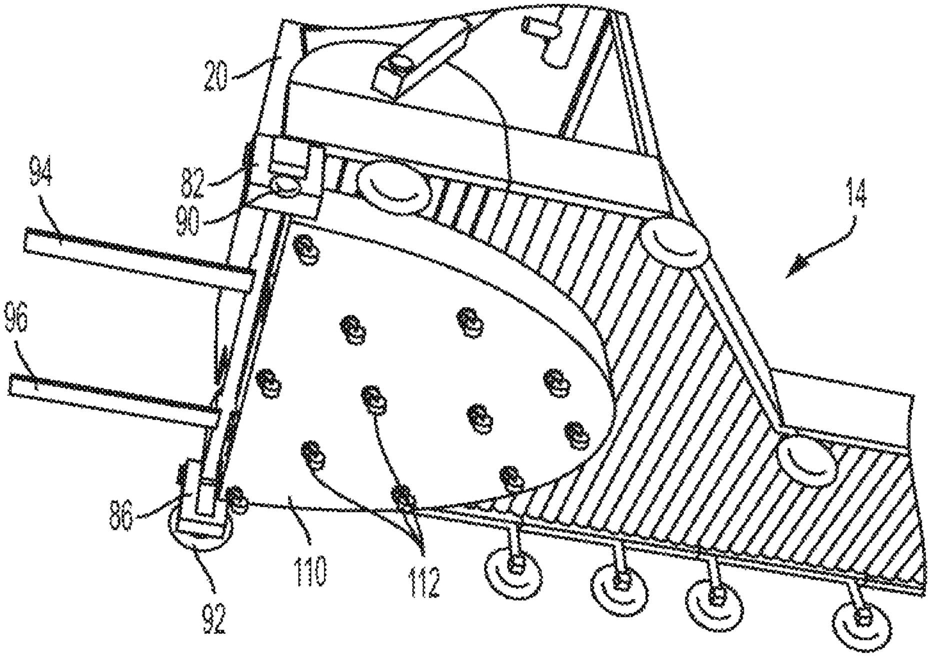
FIG. 36 shows an illustrative diagrammatic underside view of the pallet removal system of FIG. 32 with the pallet removal system in a nonrotated position.
Figure 37:
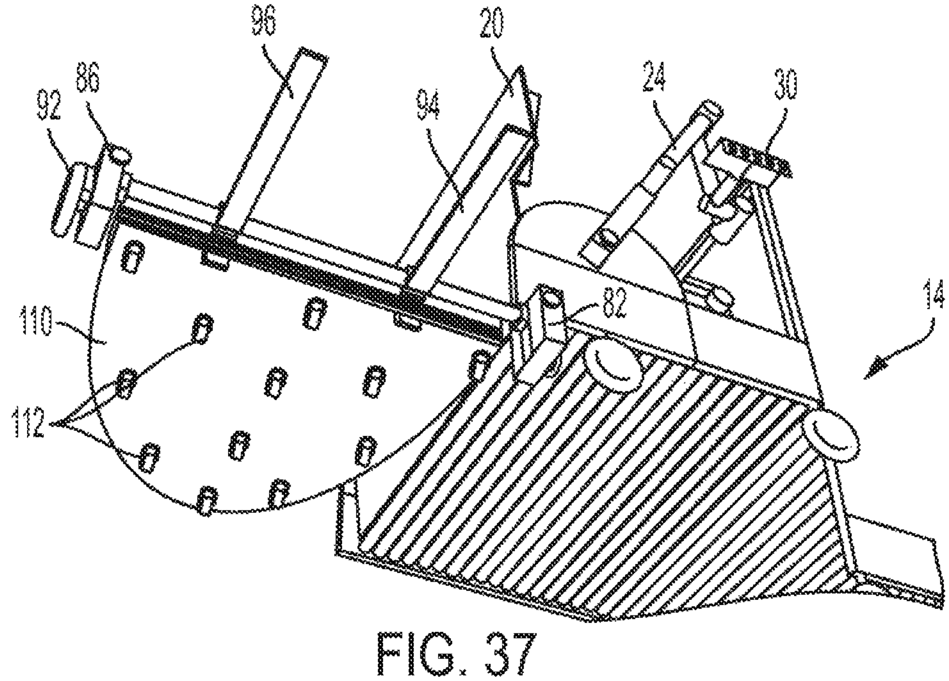
FIG. 37 shows an illustrative diagrammatic underside view of the pallet removal system of FIG. 32 with the pallet removal system in a fully rotated position.
Figure 38:
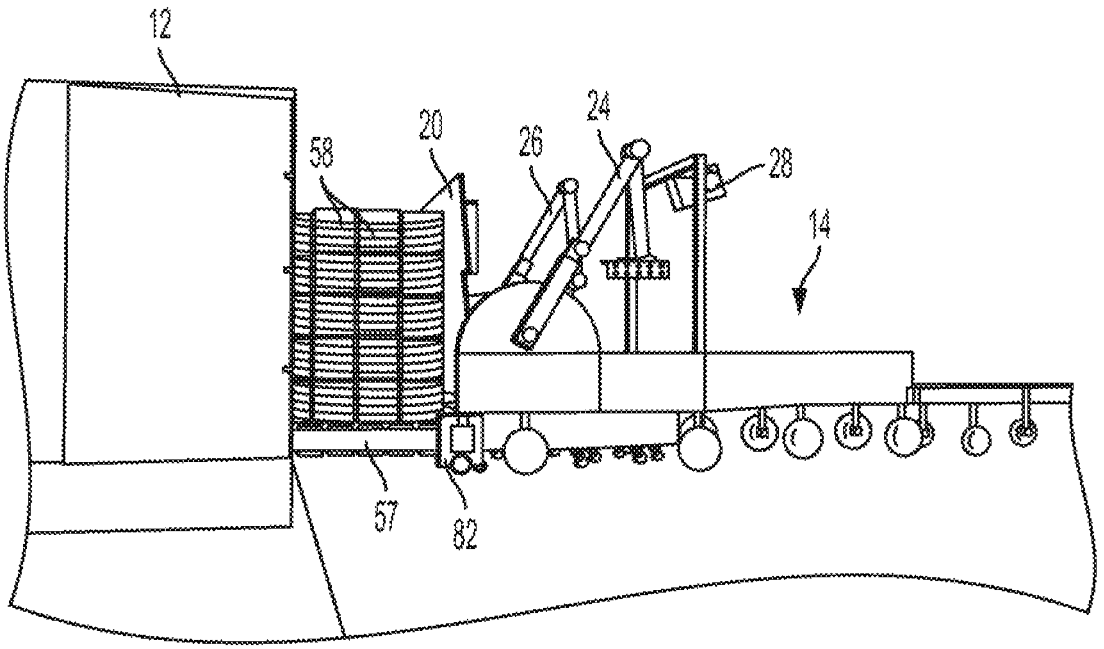
FIG. 38 show an illustrative diagrammatic side view of an object processing system in accordance with an aspect of the present invention in which a wrapped pallet is being removed from the trailer.
Figure 39:
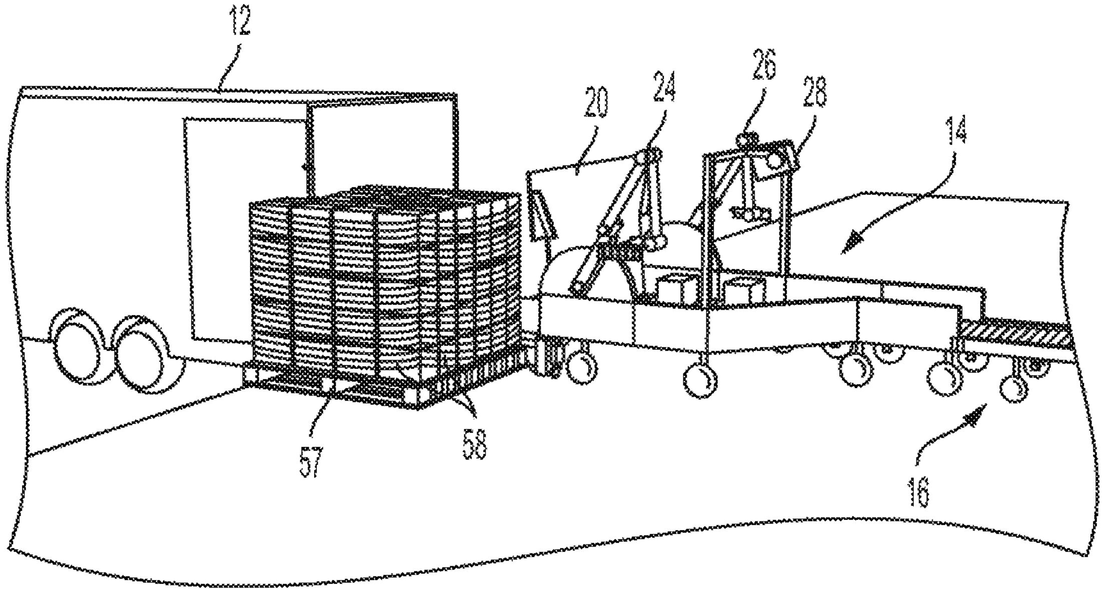
FIG. 39 shows an illustrative diagrammatic view of the object processing system of FIG. 38 wherein the wrapped pallet is being lowered onto a shipping and receiving dock.
Figure 40:
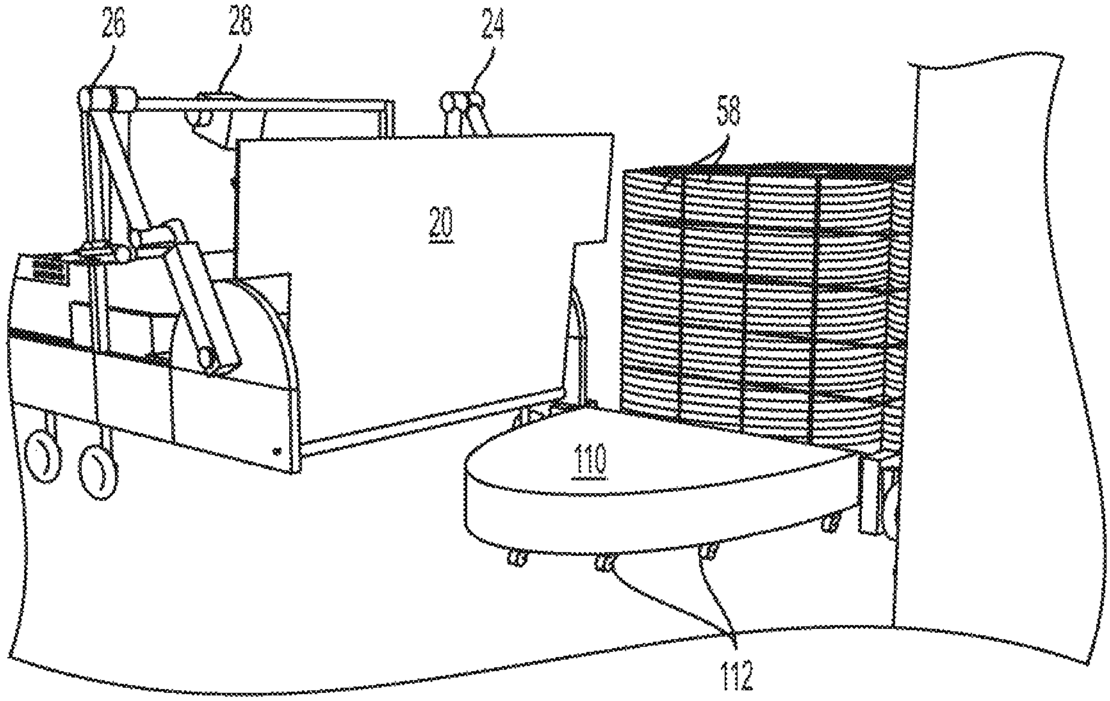
FIG. 40 shows an illustrative diagrammatic view of the object processing system of FIG. 38 with the pallet removal system in a lowered position.
Figure 41:
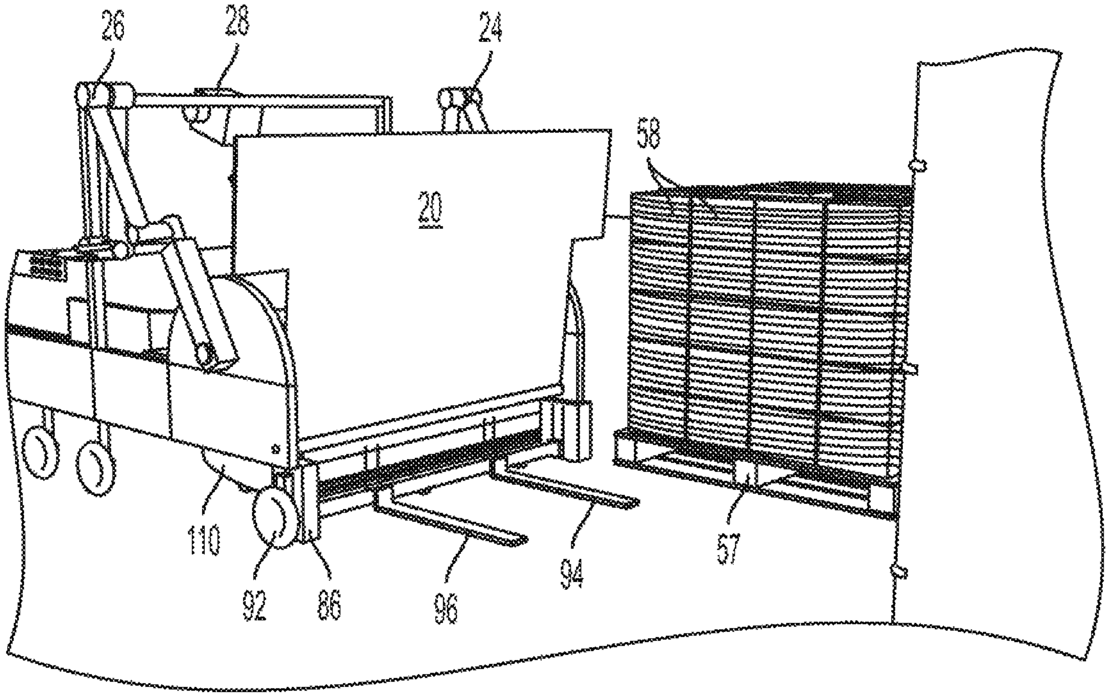
FIG. 41 shows an illustrative diagrammatic view of the object processing system of FIG. 2, wherein the wrapped pallet is removed from the trailer.

With reference to FIGS. 34 and 35, the pallet removal system 80 may be rotated with respect to the chassis 14 about the pin 84 (e.g., to 45 degrees as shown in FIG. 34, and to 90 degrees as shown in FIG. 35). FIG. 36 shows an underside view of the pallet removal system 80 under the chassis conveyor 14, and FIG. 37 shows an underside view of the pallet removal system rotated 90 degrees (as in FIG. 35). The counterweight 110 facilitates lifting of a pallet, and casters 112 (together with wheels under the pivot end 82 and swing end 86) support the weight of the counterweight 110 and the pallet. FIG. 38 shows a pallet of objects being removed from the trailer, and FIG. 39 shows the pallet of objects rotated 90 degrees by the removal system. FIG. 40 shows an opposite side view of the pallet are rotated 90 degrees in FIG. 39, and FIG. 41 shows the pallet removed and unloaded from the removal system. The removed and unloaded pallet is no longer obstructing the removal of objects from the trailer, and the dynamic engagement system may re-enter the trailer and again begin removing objects. The removed and unloaded pallet may be processed by human personnel.

Figure 42:
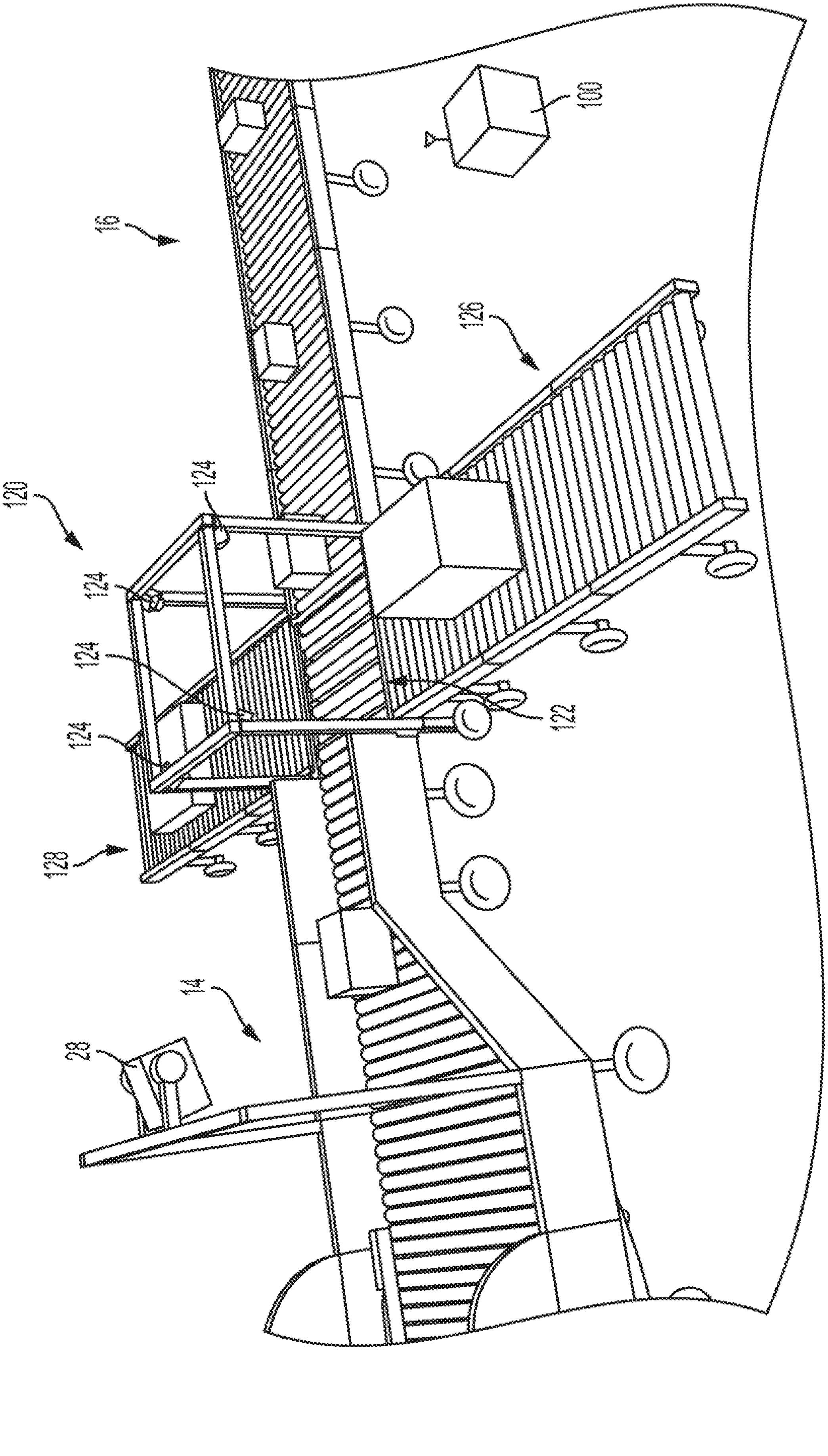
FIG. 42 shows an illustrative diagrammatic view of the object processing as claimed in claim 38 wherein the objects are diverted based on any of weight or incompatibility.

FIG. 42 shows an output system in accordance with further aspects of the present invention that includes a perception system 120 with a diverting system 122. The perception system may include one or more perception units 124 that provide any of camera images, or scan data such as 2D or 3D scan data, or perception information regarding any identification code such as a barcode, QR code of other unique identification markings. The perception system may further include a weight sensing conveyor section as part of the diverting system 122 (e.g., with rollers or diverter belts mounted on load cells). The diverter 122 may include di-directional belts that are selectively elevatable between the rollers. The perception and diverting systems sit between the chassis 14 and the warehouse conveyor 16, and permit outlier items such as heavy or large items to be diverted to one or another diverter paths 126, 128 for either alternate automated processing or for processing by human personnel. The decision to divert any object is based on the perception information from the perception system (e.g., size, weight, identification etc.).

Those skilled in the art will appreciate that numerous modifications and variations may be made to the above disclosed embodiments without departing from the spirit and scope of the present invention.

What is claimed is:

1. An object processing system for dynamically providing the removal of a plurality of objects from a trailer of a tractor trailer, said object processing system comprising:

a load assessment system for assessing a load characteristic of the plurality of objects within the trailer and for providing load assessment data representative of the load characteristic;

an object assessment system for assessing a relative position and relative environment of an object of the plurality of objects responsive to the load assessment data, and for providing object assessment data for the object; and a dynamic engagement system for dynamically engaging the plurality of objects within the trailer with each of at least two different engagement systems responsive to the object assessment data, each of the at least two different engagement systems independently engage the plurality of objects within the trailer.

2. The object processing system as claimed in claim 1, wherein the load assessment system includes a plurality of perception units that provide perception data, and wherein the load characteristic includes a height of the plurality of objects.

3. The object processing system as claimed in claim 1, wherein the load assessment system includes a plurality of perception units that provide perception data, and wherein the load characteristic includes a proximity of the plurality of objects to a back end of the trailer.

4. The object processing system as claimed in claim 1, wherein the object assessment system includes at least one perception unit, and wherein the object assessment data includes data representative of whether the object includes a side surface that includes a portion that is not in contact with another object.

5. The object processing system as claimed in claim 1, wherein the object assessment system includes at least one perception unit, and wherein the object assessment data includes data representative of whether the object includes a back surface that includes a portion that is not in contact with another object.

6. The object processing system as claimed in claim 1, wherein the dynamic engagement system includes at least one dual purpose arm including a grasping portion for grasping a facing surface of the object, and a pulling portion for pulling a non-facing surface of the object.

7. The object processing system as claimed in claim 6, wherein the grasping portion includes at least one vacuum cup, and wherein the pulling portion is orthogonally disposed with respect to the at least one vacuum cup.

8. The object processing system as claimed in claim 1, wherein the object processing system further includes a securement detection system for detecting whether any of the plurality of objects within the trailer are secured from movement relative to any of the trailer or other objects of the plurality of objects.

9. The object processing system as claimed in claim 8, wherein the securement detection system determines whether a subset of the plurality of objects is provided on a pallet.

10. The object processing system as claimed in claim 9, wherein the object processing system further includes a pallet removal system of engaging the pallet and removing the pallet and the subset of the plurality of objects from the trailer.

11. The object processing system as claimed in claim 10, wherein the pallet removal system includes pallet lift forks that are mounted on a swing arm under the dynamic engagement system.

12. The object processing system as claimed in claim 9, wherein the securement detection system determines whether a subset of the plurality of objects is retained by a net within the trailer.

13. An object processing system for dynamically providing the removal of a plurality of objects from a trailer of a tractor trailer, said object processing system comprising:

a load assessment system for assessing a load characteristic of the plurality of objects within the trailer and for providing load assessment data representative of the load characteristic;

at least two engagement systems for independently engaging the plurality of objects within the trailer responsive to the load assessment data; and a securement detection system for detecting whether any of the plurality of objects within the trailer are secured from movement relative to any of the trailer or other objects of the plurality of objects.

14. The object processing system as claimed in claim 13, wherein the load assessment system includes a plurality of perception units that provide perception data, and wherein the load characteristic includes a height of the plurality of objects.

15. The object processing system as claimed in claim 13, wherein the load assessment system includes a plurality of perception units that provide perception data, and wherein the load characteristic includes a proximity of the plurality of objects to a back end of the trailer.

16. The object processing system as claimed in claim 13, wherein at least one of the engagement systems includes a dual purpose arm including a grasping portion for grasping a facing surface of the object, and a pulling portion for pulling a non-facing surface of the object.

17. The object processing system as claimed in claim 16, wherein the grasping portion includes at least one vacuum cup, and wherein the pulling portion is orthogonally disposed with respect to the at least one vacuum cup.

18. The object processing system as claimed in claim 13, wherein the securement detection system determines whether a subset of the plurality of objects is provided on a pallet.

19. The object processing system as claimed in claim 18, wherein the object processing system further includes a pallet removal system of engaging the pallet and removing the pallet and the subset of the plurality of objects from the trailer.

20. The object processing system as claimed in claim 19, wherein the pallet removal system includes pallet lift forks that are mounted on a swing arm under the dynamic engagement system.

21. The object processing system as claimed in claim 13, wherein the securement detection system determines whether a subset of the plurality of objects is retained by a net within the trailer.

22. The object processing system as claimed in claim 13, wherein the object processing system further includes an object assessment system for assessing a relative position and relative environment of an object of the plurality of objects responsive to the load assessment data, and for providing object assessment data for the object.

23. The object processing system as claimed in claim 13, wherein the object assessment system includes at least one perception unit, and wherein the object assessment data includes data representative of whether the object includes a side surface that includes a portion that is not in contact with another object.

24. The object processing system as claimed in claim 13, wherein the object assessment system includes at least one perception unit, and wherein the object assessment data includes data representative of whether the object includes a back surface that includes a portion that is not in contact with another object.

25. An object processing system for dynamically providing the removal of a plurality of objects from a trailer of a tractor trailer, said object processing system comprising:

- an object assessment system for assessing a relative position and immediate environment of an object of the plurality of objects, and for providing object assessment data for the object;
- a dynamic engagement system for dynamically engaging the plurality of objects within the trailer with each of at least two different engagement systems responsive to the object assessment data, each of the at least two different engagement systems independently operating to engage the plurality of objects within the trailer; and
- a securement detection system for detecting whether any of the plurality of objects within the trailer are secured from movement relative to any of the trailer or other objects of the plurality of objects.

26. The object processing system as claimed in claim 25, wherein the object assessment system includes at least one perception unit, and wherein the object assessment data includes data representative of whether the object includes a side surface that includes a portion that is not in contact with another object.

27. The object processing system as claimed in claim 25, wherein the object assessment system includes at least one perception unit, and wherein the object assessment data includes data representative of whether the object includes a back surface that includes a portion that is not in contact with another object.

28. The object processing system as claimed in claim 25, wherein the dynamic engagement system includes at least one dual purpose arm including a grasping portion for grasping a facing surface of the object, and a pulling portion for pulling a non-facing surface of the object.

29. The object processing system as claimed in claim 28, wherein the grasping portion includes at least one vacuum cup, and wherein the pulling portion is orthogonally disposed with respect to the at least one vacuum cup.

30. The object processing system as claimed in claim 25, wherein the securement detection system determines whether a subset of the plurality of objects is provided on a pallet.

31. The object processing system as claimed in claim 30, wherein the object processing system further includes a pallet removal system of engaging the pallet and removing the pallet and the subset of the plurality of objects from the trailer.

32. The object processing system as claimed in claim 31, wherein the pallet removal system includes pallet lift forks that are mounted on a swing arm under the dynamic engagement system.

33. The object processing system as claimed in claim 25, wherein the securement detection system determines whether a subset of the plurality of objects is retained by a net within the trailer.

34. The object processing system as claimed in claim 25, wherein the object processing system further includes a load assessment system for assessing a load characteristic of a plurality of objects within the trailer and for providing load assessment data representative of the load characteristic.

35. The object processing system as claimed in claim 34, wherein the load assessment system includes a plurality of perception units that provide perception data, and wherein the load characteristic includes a height of the plurality of objects.

36. The object processing system as claimed in claim 34, wherein the load assessment system includes a plurality of perception units that provide perception data, and wherein the load characteristic includes a proximity of the plurality of objects to a back end of the trailer.

37. The object processing system as claimed in claim 25, wherein the dynamic engagement system includes a collection panel that is elevationally and rotatably adjustable.

38. The object processing system as claimed in claim 37, wherein the collection panel is formed of multiple subpanels that may be moved relative to one another.

39. The object processing system as claimed in claim 25, wherein the object processing system further includes an obstruction removal system that develops a removal model based at least on part on force feedback from joints of an articulated arm.

40. The object processing system as claimed in claim 25, wherein the object processing system further includes an output perception system for providing perception data regarding objects provided by the dynamic engagement system, and a diverting system for diverting certain selected objects responsive to the perception data.

41. A method of processing a plurality of objects comprising:

- assessing a load characteristic of a plurality of objects within a trailer and for providing load assessment data representative of the load characteristic;

assessing a relative position and relative environment of an object of the plurality of objects responsive to the load assessment data, and for providing object assessment data for the object; and dynamically engaging the plurality of objects within the trailer with each of at least two different engagement systems responsive to the object assessment data.

42. The method as claimed in claim 41, wherein the method further includes elevationally and rotationally adjusting a collection panel for receiving the plurality of objects.

* * * * *